(12) United States Patent
Ogata

(10) Patent No.: US 9,104,554 B2
(45) Date of Patent: Aug. 11, 2015

(54) STORAGE APPARATUS, STORAGE CONTROLLER AND METHOD FOR RELOCATING DATA IN SOLID STATE DRIVE

(71) Applicants: KABUSHIKI KAISHA TOSHIBA, Tokyo (JP); TOSHIBA SOLUTIONS CORPORATION, Tokyo (JP)

(72) Inventor: Katsuhiko Ogata, Kodaira (JP)

(73) Assignees: KABUSHIKI KAISHA TOSHIBA, Tokyo (JP); TOSHIBA SOLUTIONS CORPORATION, Tokyo (JP)

( * ) Notice: Subject to any disclaimer, the term of this patent is extended or adjusted under 35 U.S.C. 154(b) by 211 days.

(21) Appl. No.: 13/849,073

(22) Filed: Mar. 22, 2013

(65) Prior Publication Data

US 2014/0289449 A1    Sep. 25, 2014

Related U.S. Application Data

(63) Continuation of application No. PCT/JP2012/074482, filed on Sep. 25, 2012.

(51) Int. Cl.
*G06F 12/02* (2006.01)

(52) U.S. Cl.
CPC .... *G06F 12/0246* (2013.01); *G06F 2212/7205* (2013.01)

(58) Field of Classification Search
CPC ............... G06F 12/0246; G06F 2212/7201; G06F 2212/7211; G06F 2212/7202; G06F 11/008; G06F 12/0804; G06F 12/0893; G06F 12/126; G06F 12/1425; G06F 21/52; G06F 21/64; G06F 2212/1036; G06F 2212/2022
USPC ......................................................... 711/103
See application file for complete search history.

(56) References Cited

U.S. PATENT DOCUMENTS

| | | |
|---|---|---|
| 2007/0198769 A1 | 8/2007 | Shin et al. |
| 2010/0005228 A1 | 1/2010 | Fukutomi et al. |
| 2010/0037009 A1 | 2/2010 | Yano et al. |

FOREIGN PATENT DOCUMENTS

| | | |
|---|---|---|
| JP | 2007-079787 | 3/2007 |
| JP | 2007-220101 | 8/2007 |
| JP | 2010-015516 | 1/2010 |
| JP | 2010-267273 | 11/2010 |
| JP | 2012-141946 | 7/2012 |

OTHER PUBLICATIONS

First Office Action issued by Japanese Patent Office in counterpart Application No. 2012-543822 mailed Jan. 28, 2014, and English translation thereof.
International Search Report mailed Oct. 30, 2012, for International Application No. PCT/JP2012/074482, of which the present application is a continuation.

*Primary Examiner* — Yong Choe
(74) *Attorney, Agent, or Firm* — Finnegan, Henderson, Farabow, Garrett & Dunner, LLP

(57) ABSTRACT

According to one embodiment, a storage controller comprises an access statistic collection unit, a selection unit and a rewrite unit. The access statistic collection unit collects write frequencies of a plurality of small logical address areas having a predetermined size which configure a logical area of a logical unit defined using a solid state drive. The selection unit selects a set of first small logical address areas having low write frequencies from the logical unit. The rewrite unit collectively rewrites data of the set of the first small logical address areas to the solid state drive, and collectively rewrites data of a set of remaining second small logical address areas to the solid state drive.

20 Claims, 14 Drawing Sheets

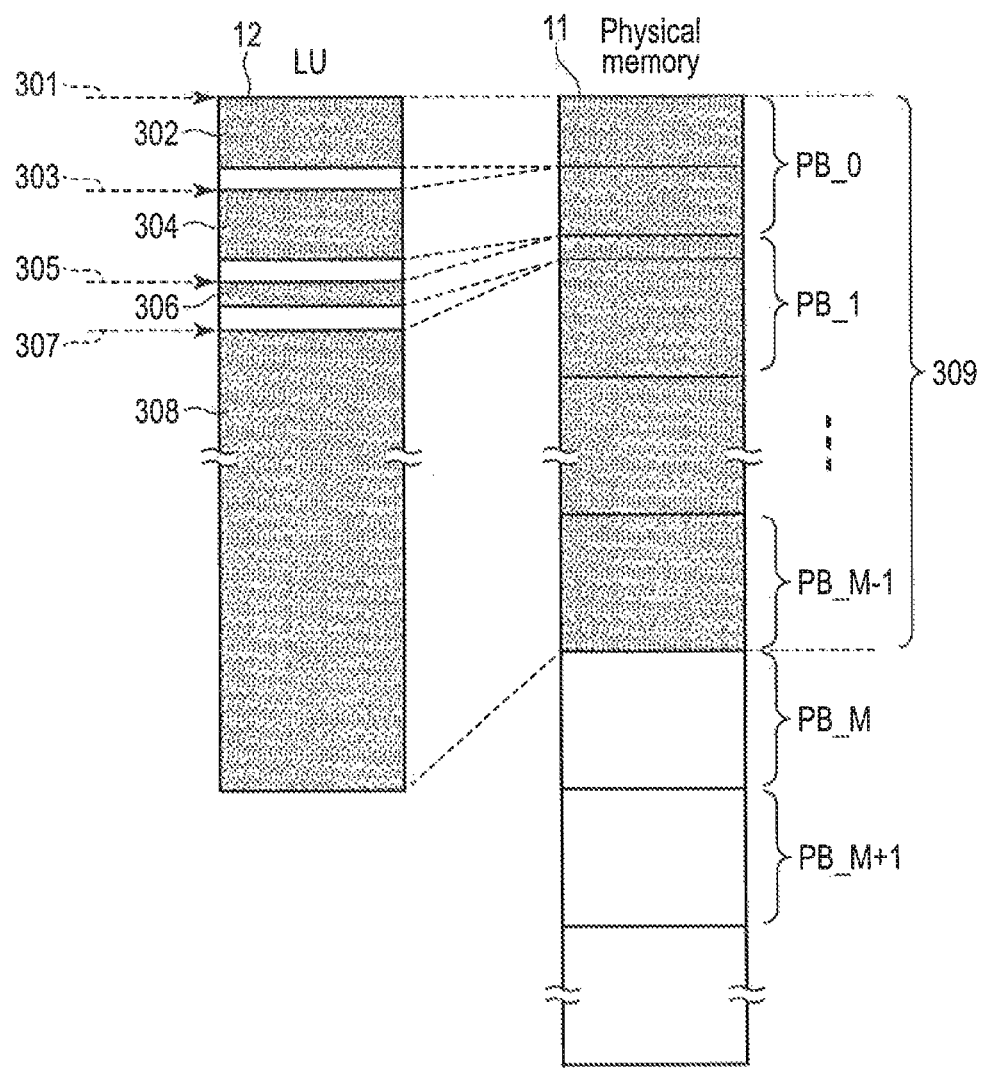
F I G. 3

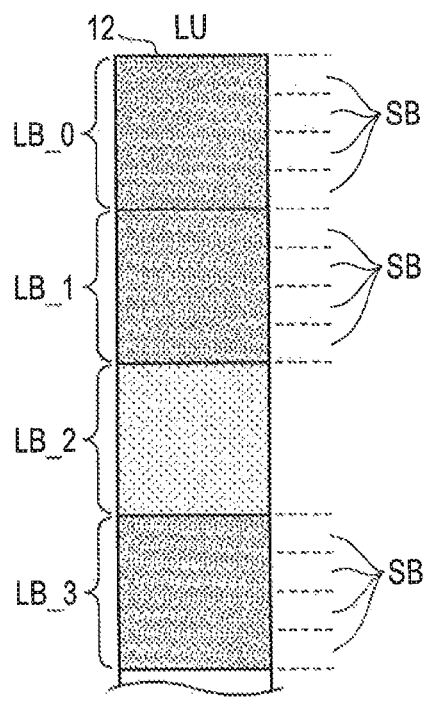
F I G. 5
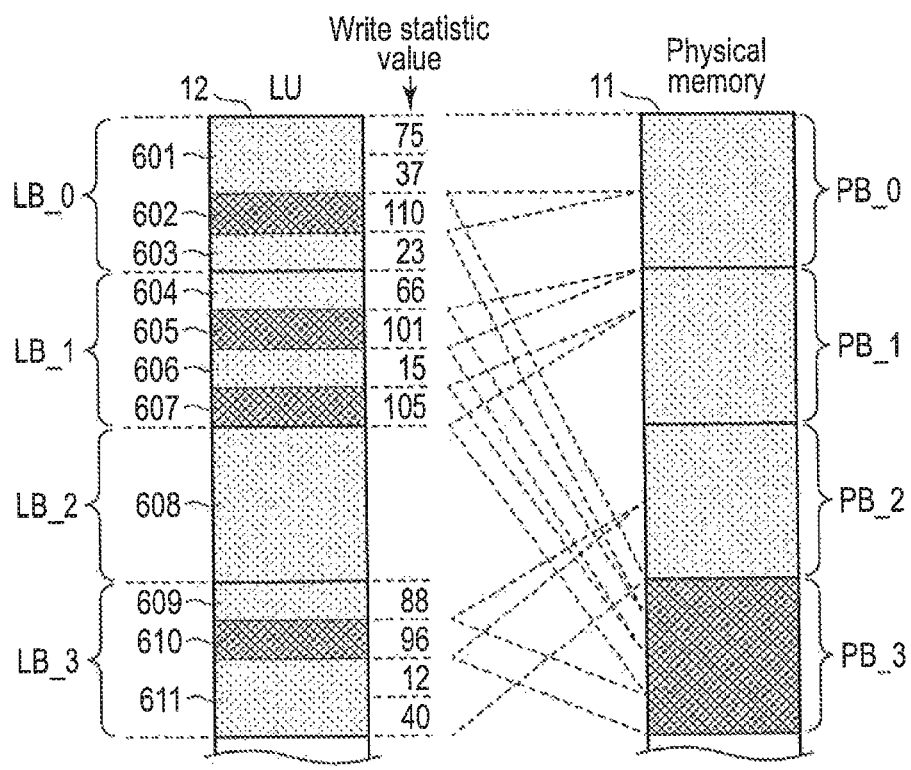
F I G. 6

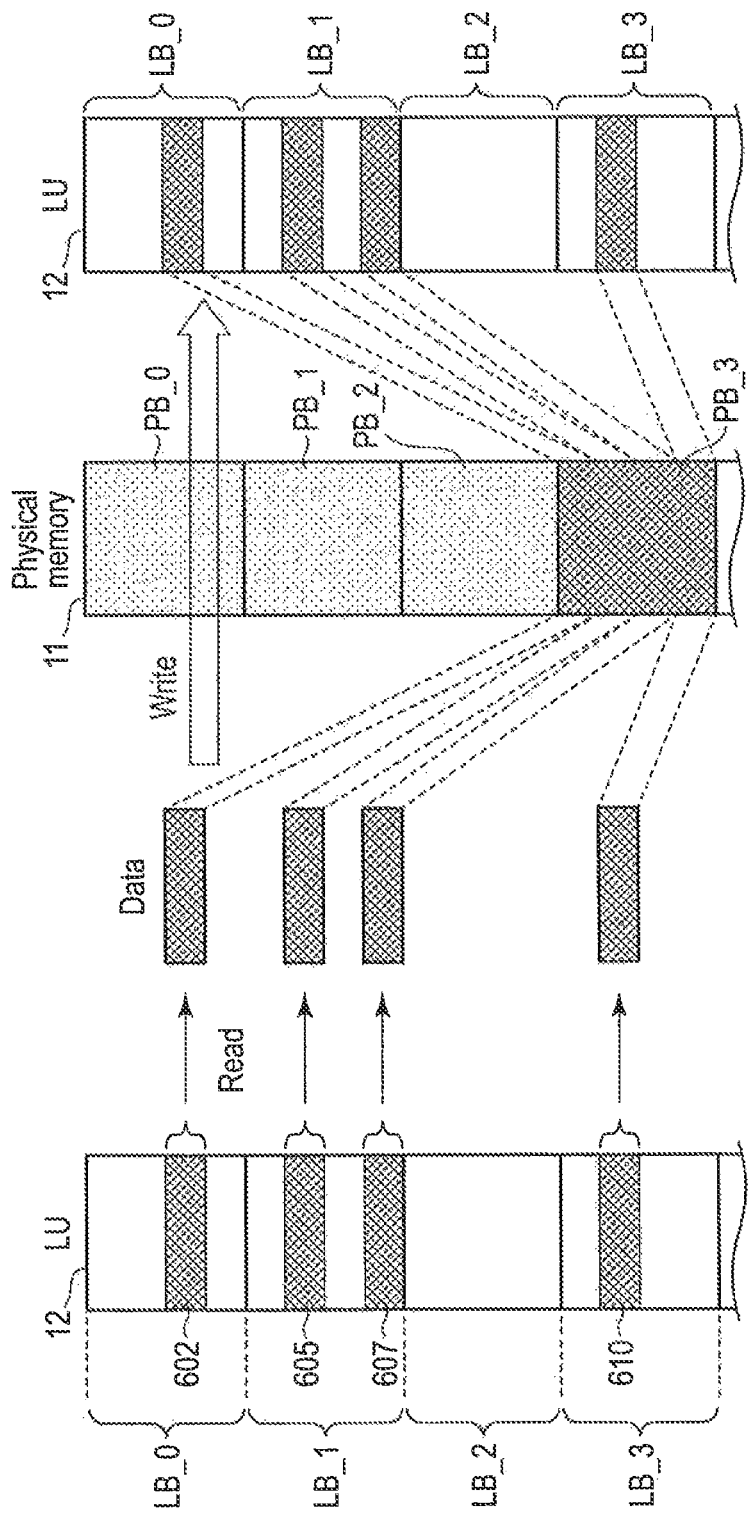
F I G. 8

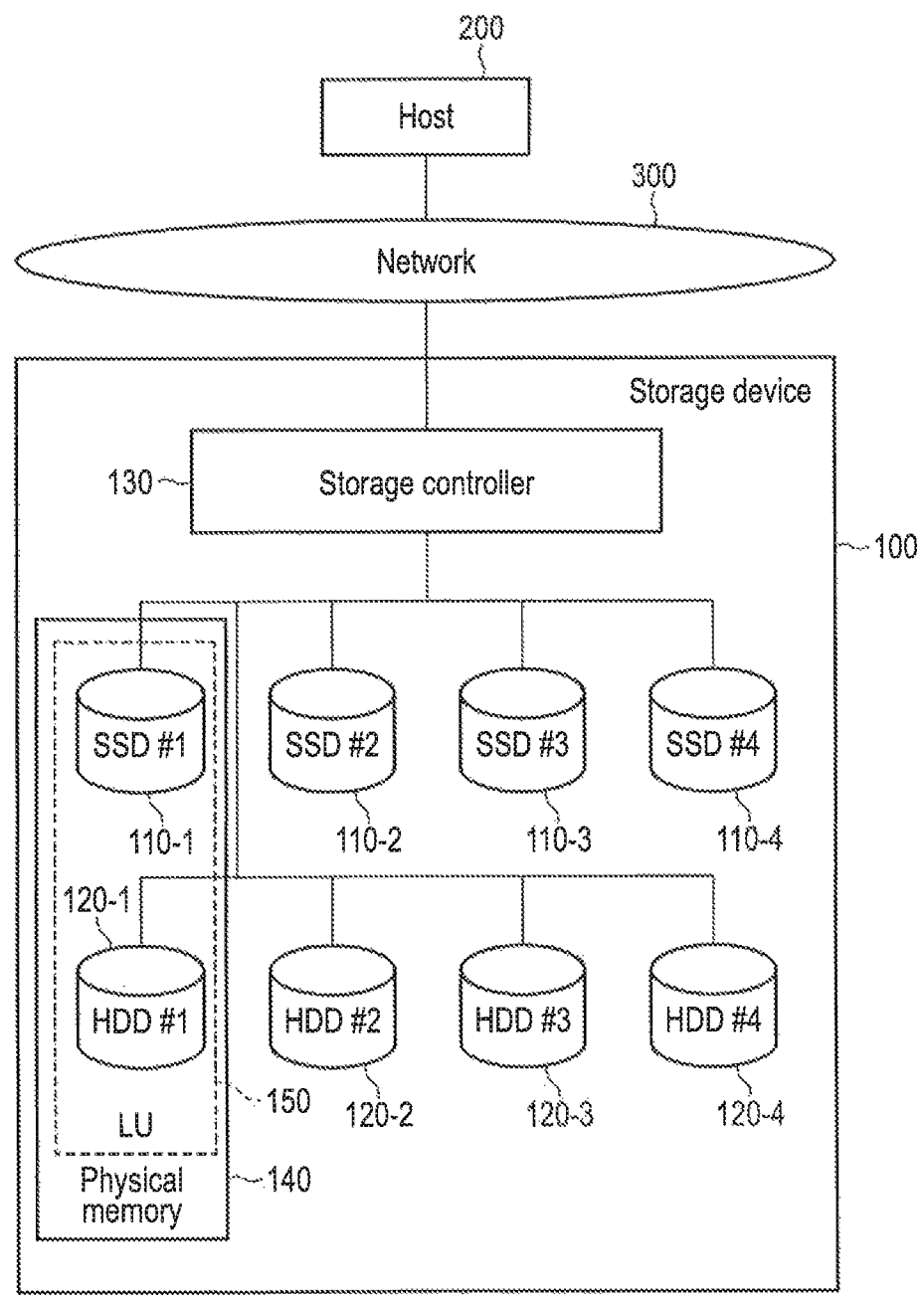
F I G. 10

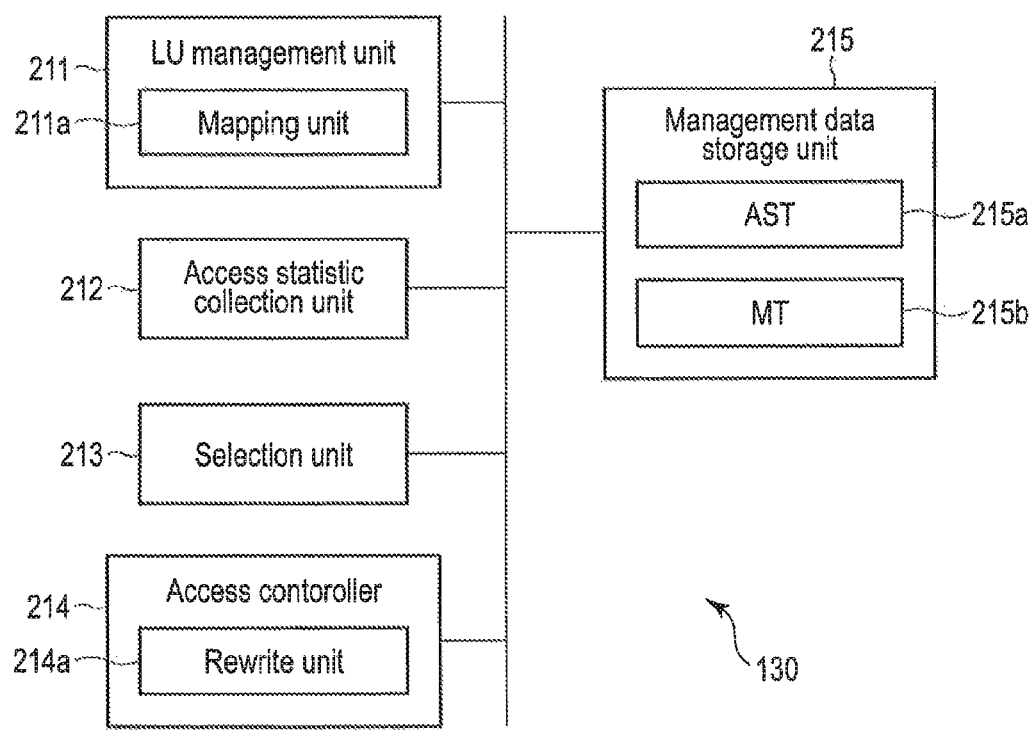
F I G. 11

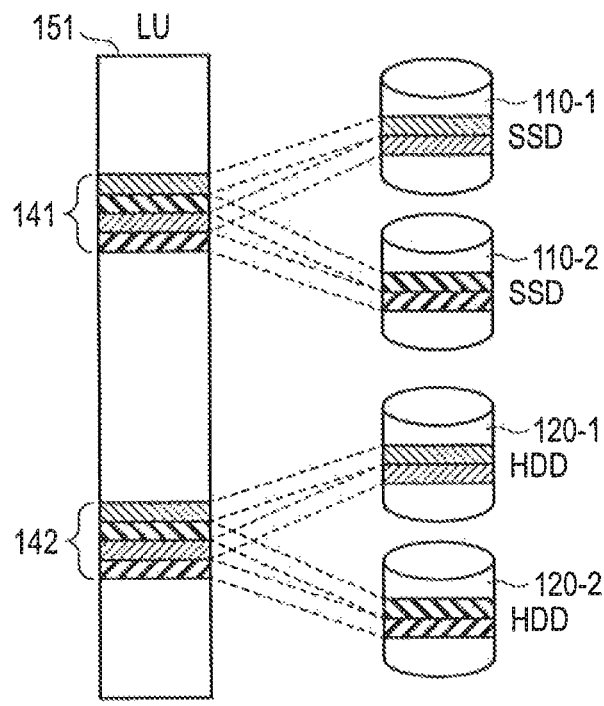
F I G. 14
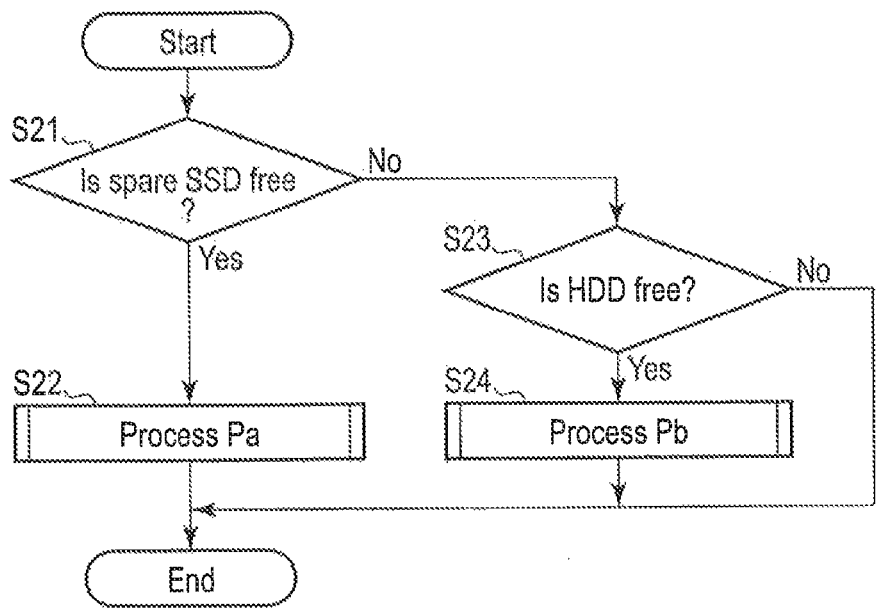
F I G. 15

STORAGE APPARATUS, STORAGE CONTROLLER AND METHOD FOR RELOCATING DATA IN SOLID STATE DRIVE

CROSS REFERENCE TO RELATED APPLICATIONS

This application is a Continuation application of PCT Application No. PCT/JP2012/074482, filed Sep. 25, 2012, the entire contents of which are incorporated herein by reference.

FIELD

Embodiments described herein relate generally to a storage apparatus, a storage controller and a method for relocating data in a solid state drive.

BACKGROUND

In recent years, storage apparatuses (storage devices) each including a solid state drive (SSD) appear. The SSD is constructed from a rewritable non-volatile memory. A flash memory is generally used as the rewritable non-volatile memory. Since the SSD does not require mechanical control accompanying rotation of a disk, it is possible to access the SSD at a high speed as compared with a hard disk drive (HDD) using a magnetic disk.

However, to write to the SSD (more specifically, flash memory in SSD), some restrictions are imposed unlike writing to the HDD. Firstly, when data which is already written to the SSD is to be rewritten, there is required a procedure to erase the data (i.e., existing old data) and then to write new data. To erase data, it is only possible to execute the erasing in units called blocks (memory block or physical block) of about several hundred kilobytes (KB).

Hence, the SSD is generally configured using a flash memory having a capacity larger than a capacity of a storage device required (or recognized) by a host computer (hereinafter, referred to as a host) utilizing the SSD. A storage device including a plurality of SSDs defines (constructs) a plurality of logical units (logical disks) by selectively allocating a plurality of physical blocks to the plurality of logical units. The plurality of physical blocks are obtained by partitioning a storage area of each of the SSDs into predetermined capacities (sizes). The host reads and writes data from and to the logical units. The SSD is called a physical memory or a physical disk. A logical address is used when the logical unit is accessed from the host, and a physical address is used when the physical memory accessed. Generally, the logical address is not equal to the physical address. Even if the logical address is equal to the physical address in an initial state, when rewriting of data in the logical unit (i.e., rewriting of data in physical memory) is repeated, the logical address becomes different from the physical address.

The host accesses the physical memory (SSD) by logically accessing the logical unit using the logical address. To make it possible for the host to access, for example, a controller incorporated in the SSD manages a corresponding relation between the logical address and the physical address.

It is assumed that the storage device is in its initial state where the logical address and the physical address are equal to each other. It is assumed that in this state, data having a size smaller than a block size is written to the logical unit. In this case, the SSD does not write data to the physical block that is allocated to the logical address where the writing is executed, and does not update the data. Instead of updating the data, old data before it is updated is managed as invalid. On the other hand, the SSD newly allocates an unused physical block to the logical address, and data is written to this newly allocated physical block.

Generation of an area of invalidated data in the SSD is called fragmentation of a memory area (more specifically, effective memory area). It is assumed that fragmentation of the memory area proceeds, and the blocks (more specifically, blocks in use) including the invalidated data areas increase. In this case, since free blocks (unused physical blocks) that can be used in the SSD (physical memory) are reduced, it becomes impossible to write new data. Hence, the SSD autonomously lumps together and rewrites effective data recorded in a plurality of physical blocks including the invalidated data to an unused physical block. Then, the SSD erases data in the plurality of physical blocks that become unnecessary by the rewriting. Such a process is called a defragmentation process. By the defragmentation process, the plurality of the physical blocks can be re-used as unused blocks (free blocks).

However, a frequency of execution of the defragmentation process becomes high in the SSD, and an access speed of the SSD lowers.

Hence, it is required to reduce the frequency of the execution of the defragmentation process in the SSD.

BRIEF DESCRIPTION OF THE DRAWINGS

FIG. 3 is a diagram for explaining rewriting of data to logical address areas having low writing frequencies in the first embodiment.

FIG. 5 is a diagram for explaining a relation among a storage area of a logical unit, logical blocks and statistic blocks in the first embodiment.

FIG. 6 is a diagram for explaining a relation between a write statistic value for each statistic block and a relocation position of data of the statistic block in the first embodiment.

FIG. 8 is a diagram for explaining rewriting of data of statistic blocks having small write statistic values in the first embodiment.

FIG. 10 is a block diagram showing an exemplary hardware configuration of a storage system including a storage device according to a second embodiment.

FIG. 11 is a block diagram mainly showing an exemplary function configuration of a storage controller shown in FIG. 10.

FIG. 14 is a diagram for explaining striping for each unit of mapping in a modification of the second embodiment.

FIG. 15 is a flowchart showing a procedure of the entire rewriting process in the modification.

DETAILED DESCRIPTION

Various embodiments will be described hereinafter with reference to the accompanying drawings.

In general, according to one embodiment, a storage apparatus comprises a first solid state drive and a storage controller. The storage controller is configured to control the first solid state drive. The storage controller comprises a logical unit management unit, an access statistic collection unit, a selection unit and a rewrite unit. The logical unit management unit is configured to define a logical unit including a logical area to which a physical area of the first solid state drive is allocated. The access statistic collection unit is configured to collect write frequencies of a plurality of small logical address areas having a predetermined size which configure the logical area of the logical unit. The selection unit is configured to select, based on the write frequencies, a set of first small logical address areas having low write frequencies and a set of second small logical address areas excluding the set of the first small logical address areas, respectively from the logical unit. The rewrite unit is configured to execute first rewriting for collectively rewriting data of the set of the first small logical address areas to the first solid state drive, and second rewriting for collectively rewriting data of the set of the second small logical address areas to the first solid state drive.

First Embodiment

Figure 1:
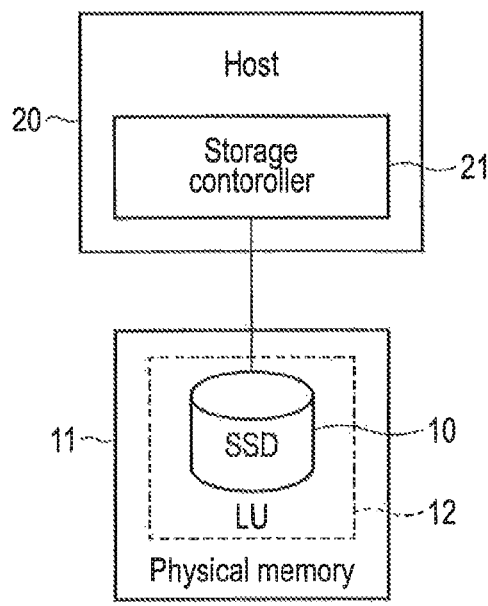
FIG. 1 is a block diagram showing an exemplary hardware configuration of a storage device according to a first embodiment.

FIG. 1 is a block diagram showing an exemplary hardware configuration of a storage device according to a first embodiment. The storage device shown in FIG. 1 includes a solid state drive (SSD) 10 and a host computer (hereinafter, referred to as a host) 20. The SSD 10 is used as a physical memory 11 of the storage device.

The host 20 includes a storage controller 21. In the first embodiment, the storage controller 21 is previously incorporated in the host 20. Alternatively, the storage controller 21 may be included in a card that is attached to a card slot of the host 20 and is used. A portion of the storage controller 21 may be incorporated in the host 20 and a remaining portion of the storage controller 21 may be included in the card.

The storage controller 21 defines a logical unit (hereinafter, referred to as an LU) that can be recognized from the host 20, using a storage area of the physical memory 11 (SSD 10). The storage controller 21 accesses the SSD 10 (physical memory 11) by logically accessing the LU 12 using a logical address. That is, the storage controller 21 requests the SSD 10 for access using the logical address. The SSD 10 (more specifically, controller incorporated in SSD 10) manages a corresponding relation between logical areas (logical addresses) of the LU 12 and physical areas (physical addresses) of the physical memory 11. The SSD 10 converts a logical address designated by an access request from the storage controller 21 into a physical address based on the corresponding relation, and accesses a physical area indicated in the physical address.

Figure 2:
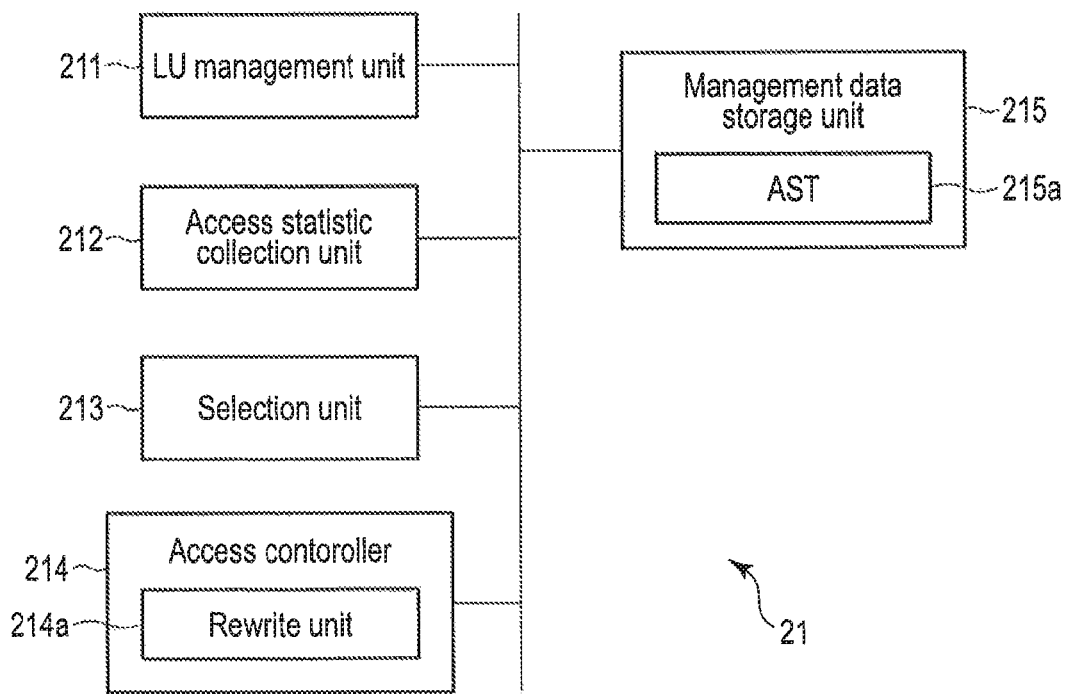
FIG. 2 is a block diagram mainly showing an exemplary function configuration of a storage controller shown in FIG. 1.

FIG. 2 is a block diagram mainly showing an exemplary function configuration of the storage controller 21 shown in FIG. 1. The storage controller 21 includes an LU (logical unit) management unit 211, an access statistic collection unit 212, a selection unit 213, an access controller 214 and a management data storage unit 215. The LU management unit 211 defines (constructs) the LU 12 and manages the same.

The access statistic collection unit 212 collects access statistic values for each small block SB (i.e., small logical address area) of the LU 12. The small block SB is one of several partial areas (for example, four partial areas) obtained by equally dividing a later-described logic block. In the following description, the small block SB is called a statistic block SB. The access statistic value, for example, comprises a write statistic value W_I and a read statistic value R_I.

The write statistic value W_I indicates the number of times of writing data to an I-th (I=0, 1, 2 ... ) statistic block SB of the LU 12 in a period (hereinafter, referred to as a statistic collection period) which is predetermined for collecting the access statistic values. That is, the write statistic value W_I indicates a write frequency (update frequency) of data to the I-th statistic block SB of the LU 12. Here, "I" is an index value (statistic index value) indicative of the statistic block SB.

The read statistic value R_I indicates the number of times of reading data from the I-th statistic block SB of the LU 12 in the statistic collection period. That is, the read statistic value R_I indicates a read frequency of data from the I-th statistic block SB of the LU 12.

The selection unit 213 selects a predetermined number of statistic blocks SB having low access frequencies (e.g., write frequencies) based on a statistic value (e.g., write statistic value W_I) for each of statistic blocks SB of the LU 12 in the access-frequency increasing order. After statistic blocks SB having low access frequencies are selected, the selection unit 213 selects remaining statistic blocks SB. That is, the selection unit 213 classifies the entire area of the LU 12 into a set of statistic blocks SB (first small blocks) having low access frequencies and a set of statistic blocks SB (second small blocks) having high access frequencies.

The access controller 214 accesses the physical memory 11 by logically accessing the LU 12 in accordance with an access request (access command) from the host 20. The access controller 214 includes a rewrite unit 214a. The rewrite unit 214a logically rewrites (overwrites) data of statistic blocks SB having low read frequencies selected by the selection unit 213 to the statistic blocks SB whenever the statistic collection period is elapsed. This logical rewriting to the LU 12 is implemented as rewriting (i.e., relocation) of data to continuous memory blocks in the physical memory 11 (controller in SSD 10). The rewrite unit 214a logically rewrites (overwrites) data of remaining statistic blocks SB to that statistic block SB after data of statistic blocks SB having low write frequencies is rewritten.

In the first embodiment, the above-described function elements of the storage controller 21 (i.e., LU management unit 211, access statistic collection unit 212, selection unit 213 and access controller 214) are software modules that are implemented by a CPU of the host 20 (or storage controller 21 in the host 20) shown in FIG. 1 executing a storage control program. Alternatively, some of or all of the function elements 211 to 214 may be implemented by hardware modules.

The management data storage unit 215, for example, is implemented using a portion of a storage area of a memory possessed by the host 20 (or storage controller 21 in host 20). An access statistic value table (hereinafter, referred to as an AST) 215a is stored in the management data storage unit 215. Each of entries of the AST 215a is used for storing an access statistic value (write statistic value W_I and read statistic value R_I) in association with a statistic index value I of the statistic block SB of the LU 12.

A feature of the first embodiment is that data of statistic blocks SB having low access frequencies selected by the selection unit 213 is relocated in a continuous memory block of the SSD 10 (physical memory 11) by rewriting of data executed by the rewrite unit 214a. A reason why such rewriting is applied will be described below.

In the first embodiment in which the SSD 10 is used as the physical memory 11, if the storage controller 21 updates data (more specifically, data having a size smaller than a block size) written in the LU 12, areas of invalid data aew generated in the SSD 10. Therefore, if update of data (writing of data) is executed in many logical areas (logical address areas) in the LU 12, fragmentation of the memory area proceeds, and the memory blocks (physical blocks) in use including areas of invalid data are increased, as apparent from the description of the prior art. In this case, the defragmentation process is autonomously executed in the SSD 10. However, if the defragmentation process is frequently executed, the access speed of the SSD 10 (physical memory 11) is decreased. This is equivalent to that the access speed of the LU 12 is decreased.

Hence, in order to reduce the frequency of execution of the defragmentation process, it is conceived to reduce invalid data in the memory blocks of the SSD 10. To that end, it is advantageous to sequentially rewrite data in all of the logical address areas of the LU 12 to that LU 12. This is because in the SSD 10, a sequential writing of data to the LU 12 is implemented as rewriting (i.e., relocation) of data to continuous free memory blocks. That is, this is because data is collectively recorded in the physical memory 11 by an operation of logically writing of the data to the LU 12 using continuous logical addresses.

However, access from the host 20 to the LU 12 tends to be executed in a similar manner (pattern) in the same storage device. Hence, even if data is arranged in continuous areas in the physical memory 11 by the sequential writing, areas of invalid data appear by subsequent writing.

Hence, in the first embodiment, in order to reduce areas of invalid data, i.e., in order to reduce a frequency of execution of the defragmentation process, selection of statistic blocks SB executed by the selection unit 213 and rewriting of data executed by the rewrite unit 214a are applied. A summary of this method will be described.

Generally, when data is written to a physical memory such as the SSD 10 by logical writing to the LU 12, writing is not uniformly generated over the entire logical address areas (logical areas) of the LU 12. That is, in the LU 12, logical address areas having low writing (update) frequencies and logical address areas having high write frequencies are distributed.

Hence, the present inventor recognizes that to reduce fragmentation of the memory area of the SSD 10 (physical memory 11), relocation of data based on a write frequency is effective. The relocation of data is to rewrite (relocate) data of logical address areas having low write frequencies and data of logical address areas having high write frequencies to different memory blocks in the SSD 10.

If such relocation of data is applied, this means that the host 20 (storage controller 21) utilizes the SSD 10 in a state where the area of the SSD 10 is classified into a set of first memory blocks having low write frequencies and a set of second memory blocks having high write frequencies. In this case, write operations to logical address areas corresponding to the set of the second memory blocks are generated, but write operations to logical address areas corresponding to the set of the first memory blocks are almost not generated at all. Hence, since generation of fragmentation can be limited to the set of the memory blocks having high write frequencies, it is possible to reduce a generation amount of fragmentation in the entire SSD 10.

Figure 4:
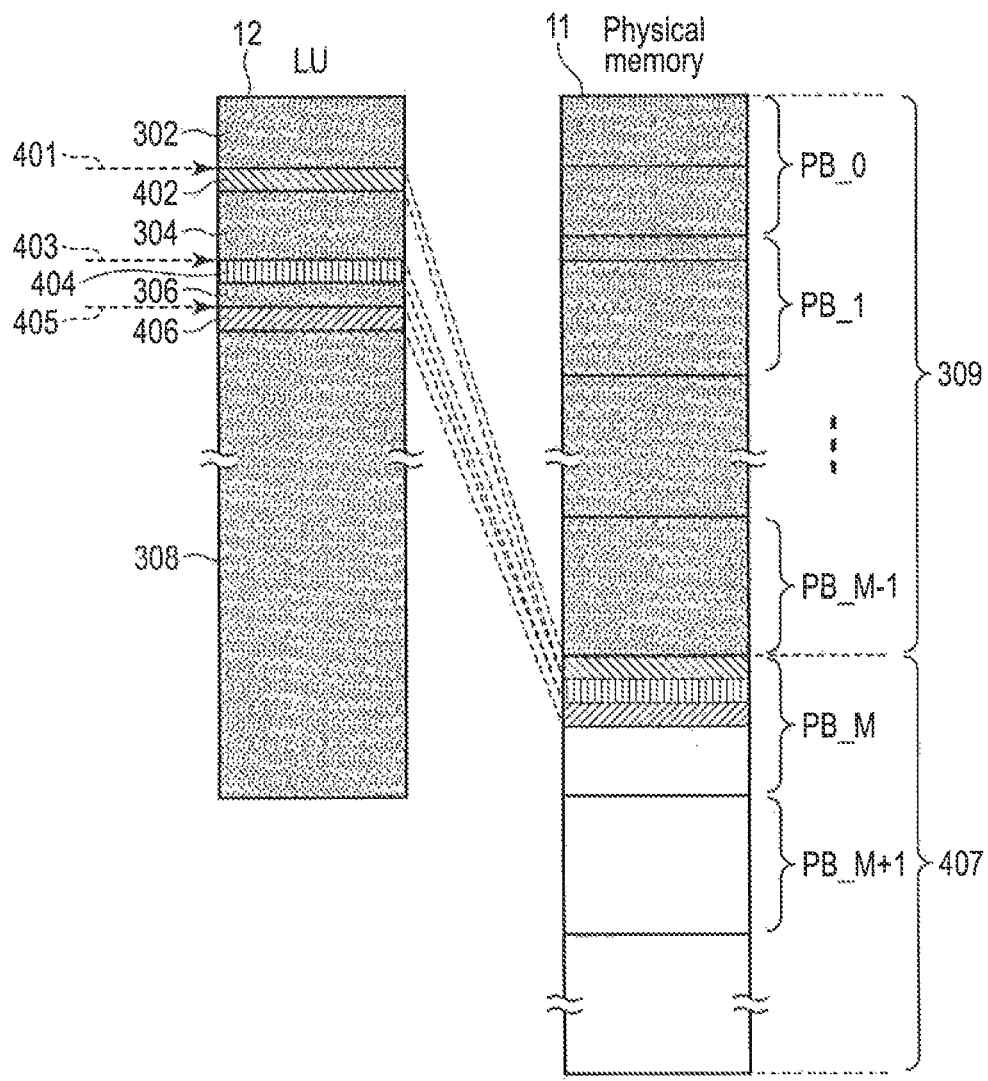
FIG. 4 is a diagram for explaining rewriting of data to logical address areas having high writing frequencies in the first embodiment.

Rewriting of data executed by the rewrite unit 214a in the first embodiment will be described below with reference to FIGS. 3 and 4. FIG. 3 is a diagram for explaining rewriting of data to logical address areas having low write frequencies. FIG. 4 is a diagram for explaining rewriting of data to logical address areas having high write frequencies. In FIG. 3, logical address areas 302, 304, 306 and 308 of the LU 12 starting from logical addresses represented by arrows 301, 303, 305 and 307 are discontinuous logical address areas having low write frequencies. In FIG. 4, logical address areas 402, 404 and 406 of the LU 12 starting from logical addresses represented by arrows 401, 403 and 405 are discontinuous logical address areas having high write frequencies (more specifically, write frequencies that are not low).

The rewrite unit 214a first continuously reads data of the logical address areas 302, 304, 306 and 308 having low write frequencies, and logically rewrites (i.e., overwrites) the read data to the logical address areas 302, 304, 306 and 308. For the rewriting, the rewrite unit 214a requests the physical memory 11 (SSD 10) for continuous reading of data from the logical address areas 302, 304, 306 and 308 and for writing of the continuously read data to the logical address areas 302, 304, 306 and 308, using corresponding logical addresses.

A storage area (physical address area) of the physical memory 11 (SSD 10) comprises a plurality of memory blocks (physical blocks) PB_0, PB_1, ..., PB_M−1, PB_M, ... of a predetermined size. Each of the memory blocks is a minimum unit of data erase in the physical memory 11.

In response to a read request from the rewrite unit 214a, the physical memory 11 (controller in SSD 10) continuously reads data of the physical address areas (physical areas) of the physical memory 11 (SSD 10) that are allocated to the logical address areas 302, 304, 306 and 308 shown in FIG. 3. For example, a total size of the logical address areas 302, 304, 306 and 308 is equal to a total size of a predetermined number of (M-number in the example of FIG. 3) memory blocks.

In response to a write quest from the rewrite unit 214a subsequent to the read request, the physical memory 11 (controller in SSD 10) invalidates physical address areas of the physical memory 11 (SSD 10) which are allocated to the logical address areas 302, 304, 306 and 308. The physical memory 11 (controller in SSD 10) secures M-number of free memory blocks (more specifically, M-number of free memory blocks whose physical positions are continuous) corresponding to a total size of the logical address areas 302, 304, 306 and 308, e.g., memory blocks PB_0, PB_1, ..., PB_M−1. As shown in FIG. 3, the physical memory 11 (controller in SSD 10) sequentially writes data specified by the write quest, i.e., data read from the logical address areas 302, 304, 306 and 308 to the memory blocks PB_0, PB_1, ..., PB_M−1 in sequence from the beginning of the memory block PB_0.

In this manner, data of the logical address areas having low write frequencies is collectively written to the set (memory block set) 309 (see FIG. 3) of the M-number of continuous memory blocks PB_0 to PB_M−1. Thereafter, the physical memory 11 (controller in SSD 10) manages the logical address areas 302, 304, 306 and 308 in association with corresponding physical address areas in the memory blocks PB_0, PB_1, ..., PB_M−1 (memory block set 309).

Next, the rewrite unit 214a rewrites data of the remaining logical address areas which are not targets of the rewriting, i.e., data of logical address areas having high write frequencies including the logical address areas 402, 404 and 406 to the logical address areas having the high write frequencies in the same manner as the rewriting of data of the logical address areas having the low write frequencies. According to this rewriting, the physical memory 11 (controller in SSD 10) sequentially writes data of the logical address areas having high write frequencies including the logical address areas 402, 404 and 406 to, for example, the set (memory block set) 407 of the continuous memory blocks starting from the memory block PB_M shown in FIG. 4.

In this manner, data of the logical address areas having high write frequencies is collectively written to the memory block set 407 (see FIG. 4) that is different from the memory block set 309. Thereafter, the physical memory 11 (controller in SSD 10) manages the logical address areas having high write frequencies including the logical address areas 402, 404 and 406 and the corresponding physical address areas in the memory block set 407 in association with each other.

As is apparent, in the block set 309 in the physical memory 11 (controller in SSD 10) in which data of areas having low write frequencies is collectively rewritten, an area of invalid data is less prone to be generated. Therefore, according to the first embodiment, a frequency of execution of the defragmentation process in the physical memory 11 (controller in SSD 10) is reduced, and it is possible to prevent the access speed of the physical memory 11 (SSD 10) from decreasing (i.e., it is possible to prevent the access speed of LU 12 from decreasing).

Next, collection of write frequencies applied in the first embodiment for the above-described rewriting will be described with reference to FIG. 5. FIG. 5 is a diagram for explaining a relation among a storage area of the LU 12, logical blocks and statistic blocks.

A storage area of the LU 12 comprises a plurality of logical blocks LB_0, LB–1, . . . having the same size as that of the memory blocks of the physical memory 11 (SSD 10). That is, the storage area of the LU 12 is divided (partitioned) into the plurality of logical blocks LB_0, LB–1, . . . having the same size as that of the memory blocks and managed by the LU management unit 211. The number of logical blocks LB_j (j=0, 1, . . . ) of the LU 12 is smaller than the number of memory blocks PB_i (i=0, 1, . . . ) of the physical memory 11 (SSD 10).

Each of the logical blocks LB_j of the LU 12 is divided into a plurality of statistic blocks (small blocks) SB of a predetermined size and managed. In an example shown in FIG. 5, each of the logical blocks LB_J is divided into four statistic blocks SB. If it is assumed that the number of the logical blocks LB_j of the LU 12 is N, the number of statistic blocks SB of the entire LU 12 is 4N. In this case, the entire logical area of the LU 12 is divided into the 4N-number of statistic blocks SB and managed. That is, the logical area of the LU 12 comprises the 4N-number of statistic blocks (small blocks) SB.

The statistic block SB is specified by the statistic index value I. In the first embodiment, the statistic blocks SB are units in which write frequencies are collected. That is, in the first embodiment, the write frequencies are collected in units of the statistic blocks SB that are smaller in size than the logical blocks LB_j (or memory block PB_i). In the first embodiment, the number of times of writing (write count) is used as a write statistic value W_I indicative of the frequency of data writing to the statistic block SB.

Whenever data writing to the statistic block SB is generated in a statistic collection period, the access statistic collection unit 212 increments the write statistic value W_I of the statistic block SB by one. In a later-described second embodiment, in addition to the write statistic value W_I for each statistic block SB, a read statistic value R_I indicative of the frequency of data reading from the statistic block SB is also used. Hence, whenever data reading from the statistic block SB is generated in the statistic collection period, the access statistic collection unit 212 increments the read statistic value R_I of the statistic block SB by one. In the second embodiment, however, the statistic block SB, i.e., the small block SB is a unit of mapping managed on the side of the storage controller unlike the first embodiment. That is, in the second embodiment, for each small block SB (unit of mapping) in the LU, the storage controller associates the small block SB and the physical area (physical area in the physical memory) with each other. The write statistic value W_I and the read statistic value R_I for each statistic block (small block) SB are stored in the AST 215*a* in association with the statistic index value I of the statistic block SB.

Here, a storage device including a physical memory (array) of RAID (Redundant Arrays of Independent Disks or Redundant Arrays of Inexpensive Disks) configuration implemented using a plurality of physical disks including the SSD is assumed. There is a possibility that such a storage device is provided with a storage controller having a function for dynamically changing a logical address of the LU based on an access statistic value. If the storage controller 21 of the disk device shown in FIG. 1 has such a function, the access statistic collection unit 212 may utilize this function.

Figure 7:
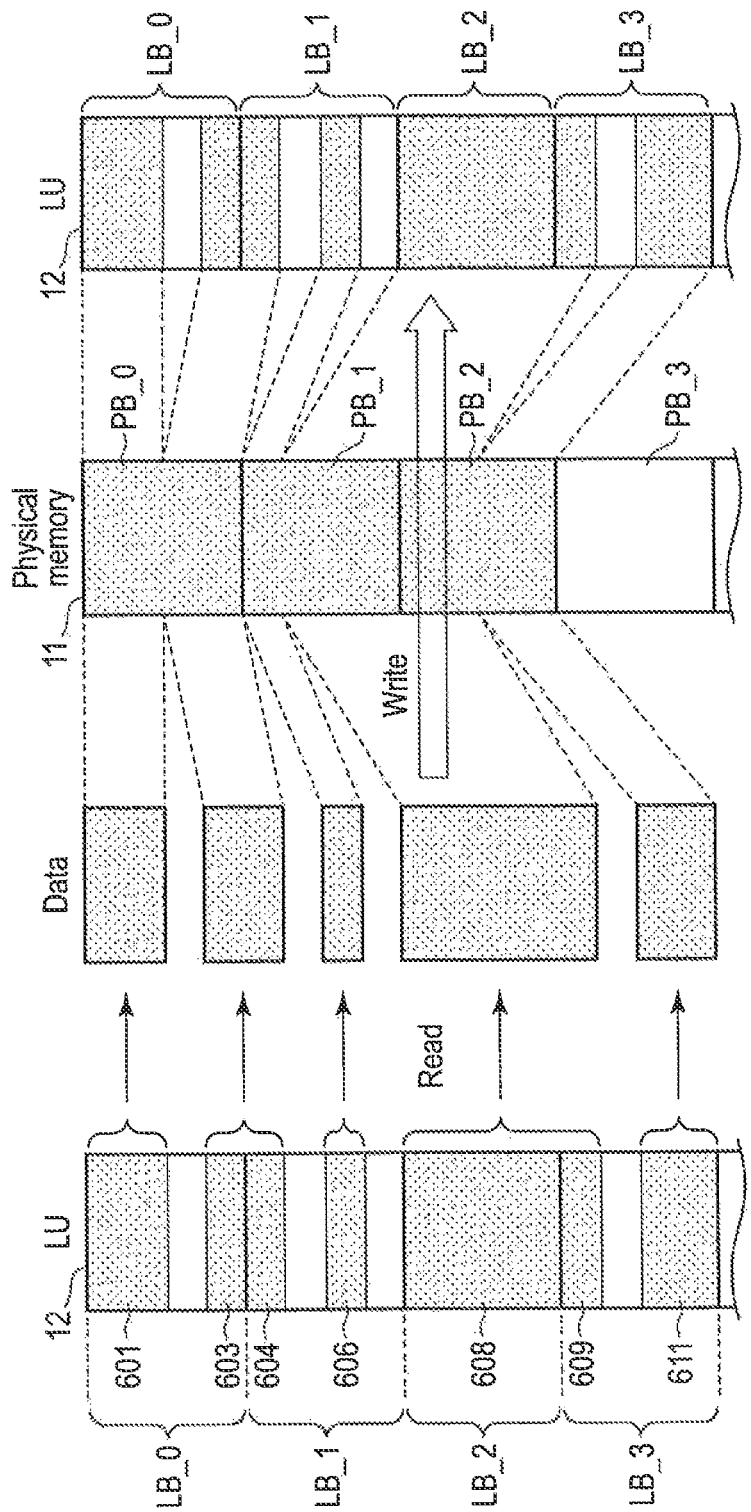
FIG. 7 is a diagram for explaining rewriting of data of statistic blocks having large write statistic values in the first embodiment.

Next, a specific example of rewriting executed by the rewrite unit 214*a* in the first embodiment will be described with reference to FIGS. 6 to 8. FIG. 6 is a diagram for explaining a relation between a write statistic value for each statistic block at the time when the statistic collection period has elapsed and a relocation position of data of the statistic block. FIG. 7 is a diagram for explaining rewriting of data of the statistic blocks having large write statistic values. FIG. 8 is a diagram for explaining rewriting of data of the statistic blocks having small write statistic values.

In the first embodiment, whenever the statistic collection period has elapsed, the rewrite unit 214*a* executes the rewriting as described below. In the example shown in FIG. 6, write statistic values W_I of four statistic blocks SB in the logical block LB_0 of the LU 12 at the time when the statistic collection period has elapsed are 75, 37, 110 and 23. Write statistic values W_I of four statistic blocks SB in the logical block LB_1 of the LU 12 are 66, 101, 15 and 105. Write statistic values W_I of four statistic blocks SB in the logical block LB_3 of the LU 12 are 88, 96, 12 and 40. It is assumed that all of the write statistic values W_I of the four statistic block SB in the logical block LB_2 of the LU 12 are less than 96, although not illustrated in FIG. 6.

When the rerewriting is executed by the rewrite unit 214*a*, the selection unit 213 sorts the statistic blocks SB in the LU 12 in ascending order of the write statistic values W_I of the statistic blocks SB. The selection unit 213 sequentially selects a predetermined number of statistic blocks SB in ascending order from the smallest write statistic values W_I as a set of statistic blocks SB (first small logical address areas) having low write frequencies. The predetermined number is 4M in the first embodiment in which each of the logical blocks is divided into four statistic blocks SB. A total size of the 4M-number of statistic blocks SB is equal to a total size of the M-number of logical blocks.

In the example shown in FIG. 6, M is three. In this case, the selection unit 213 selects 4×3 (=12) statistic blocks SB (i.e., logical address areas of size corresponding to three logical blocks) having small write statistic values W_I in an increasing order of the write statistic values W_I as statistic blocks SB having low write frequencies. That is, the selection unit 213 selects logical address areas (logical areas) comprising 4×3 statistic blocks SB having low write frequencies. Here, the selection unit 213 selects logical address areas 601, 603, 604, 606, 608, 609 and 611 in the LU 12 shown in FIG. 6.

The logical address area 601 comprises two continuous statistic blocks SB in the logical block LB_0 in which have write statistic values W_I of 75 and 37. The logical address area 603 comprises a statistic block SB in the logical block LB_0 in which has a write statistic value W_I of 23. The logical address area 604 comprises a statistic block SB in the logical block LB_1 in which has a write statistic value W_I of 66. The logical address area 606 comprises a statistic block SB in the logical block LB_1 in which has a write statistic value W_I of 15. The logical address area 608 comprises four continuous statistic blocks SB in the logical block LB_2 in which have write statistic values W_I less than 96. The logical address area 609 comprises a statistic block SB in the logical block LB_3 in which has a write statistic value W_I of 88. The logical address area 611 comprises two continuous statistic blocks SB in the logical block LB_3 in which have write statistic values W_I of 12 and 40.

As described above, the selection unit 213 selects logical address areas 601, 603, 604, 606, 608, 609 and 611 in the LU 12 in which have low write frequencies. A total size of the logical address areas 601, 603, 604, 606, 608, 609 and 611 is equal to a total size of 4M (=4×3) statistic blocks SB. The rewrite unit 214a executes an operation (first rewriting) for rewriting (overwriting), to the logical address areas 601, 603, 604, 606, 608, 609 and 611, data of the logical address areas 601, 603, 604, 606, 608, 609 and 611 having low write frequencies selected by the selection unit 213.

According to this operation, data of the logical address areas 601, 603, 604, 606, 608, 609 and 611, i.e., data of the physical address areas in the physical memory 11 (SSD 10) allocated to the logical address areas 601, 603, 604, 606, 608, 609 and 611 is relocated in M (M=3) continuous memory blocks (physical blocks) of the physical memory 11 (SSD 10). Here, it is assumed that the data of the logical address areas 601, 603, 604, 606, 608, 609 and 611 is relocated in the memory blocks PB_0 to PB_2 of the physical memory 11 (SSD 10) as shown in FIG. 6. Thereafter, the physical memory 11 (controller in SSD 10) manages the logical address areas 601, 603, 604, 606, 608, 609 and 611 and the corresponding physical address areas in the memory blocks PB_0 to PB_2 in association with each other.

More specifically, the rewrite unit 214a logically and continuously reads data of the logical address areas 601, 603, 604, 606, 608, 609 and 611 having low write frequencies in the LU 12 as shown in FIG. 7. In the physical memory 11 (controller in SSD 10), this logical reading is implemented as an operation for reading data from physical address areas which are currently allocated to the logical address areas 601, 603, 604, 606, 608, 609 and 611.

Next, the rewrite unit 214a logically and continuously rewrites (overwrites) data read from the logical address areas 601, 603, 604, 606, 608, 609 and 611 to the logical address areas 601, 603, 604, 606, 608, 609 and 611 as shown in FIG. 7. In the physical memory 11 (controller in SSD 10), this logical rewriting (overwriting) of data to the LU 12 is implemented as an operation for writing data read from the logical address areas 601, 603, 604, 606, 608, 609 and 611 to the continuous memory blocks (physical blocks) PB_0 to PB_2 in the physical memory 11 (controller in SSD 10) as shown in FIG. 7.

After data of the logical address areas having low write frequencies is rewritten, the selection unit 213 selects remaining logical address areas in the LU 12, i.e., logical address areas having high write frequencies including the logical address areas 602, 605, 607 and 610 shown in FIG. 6. The rewrite unit 214a executes an operation (second rewriting) for rewriting (overwriting) data of the logical address areas having high write frequencies selected by the selection unit 213, i.e., data of the logical address areas having high write frequencies including the logical address areas 602, 605, 607 and 610 shown in FIG. 6 to the logical address areas having high write frequencies.

According to this operation, data of the logical address areas 602, 605, 607 and 610, i.e., data of the physical address areas in the physical memory 11 (SSD 10) allocated to the logical address areas 602, 605, 607 and 610, for example, is relocated in the memory block PB_3 succeeding the memory block (physical block) PB_2 of the physical memory 11 (SSD 10) as shown in FIG. 6. Thereafter, the physical memory 11 (SSD 10) manages the logical address areas 602, 605, 607 and 610 and the corresponding physical address areas in the memory block PB_3 in association with each other.

More specifically, the rewrite unit 214a logically and continuously reads data of the logical address areas having high write frequencies including the logical address areas 602, 605, 607 and 610 in the LU 12 as shown in FIG. 8. In the physical memory 11 (controller in SSD 10), this logical reading is implemented as an operation for reading data from the physical address areas currently allocated to data of the logical address areas having high write frequencies including the logical address areas 602, 605, 607 and 610.

Next, the rewrite unit 214a logically and continuously rewrites (overwrites) data read from the logical address areas having high write frequencies including the logical address areas 602, 605, 607 and 610 to the logical address areas (i.e., original logical address areas) having high write frequencies as shown in FIG. 8. In the physical memory 11 (controller in SSD 10), this logical rewriting of data to the LU 12 is implemented as an operation for writing data read from the logical address areas having high write frequencies including the logical address areas 602, 605, 607 and 610 to continuous memory blocks starting from the memory block (physical block) PB_3 in the physical memory 11 (SSD 10) as shown in FIG. 8.

Figure 9:
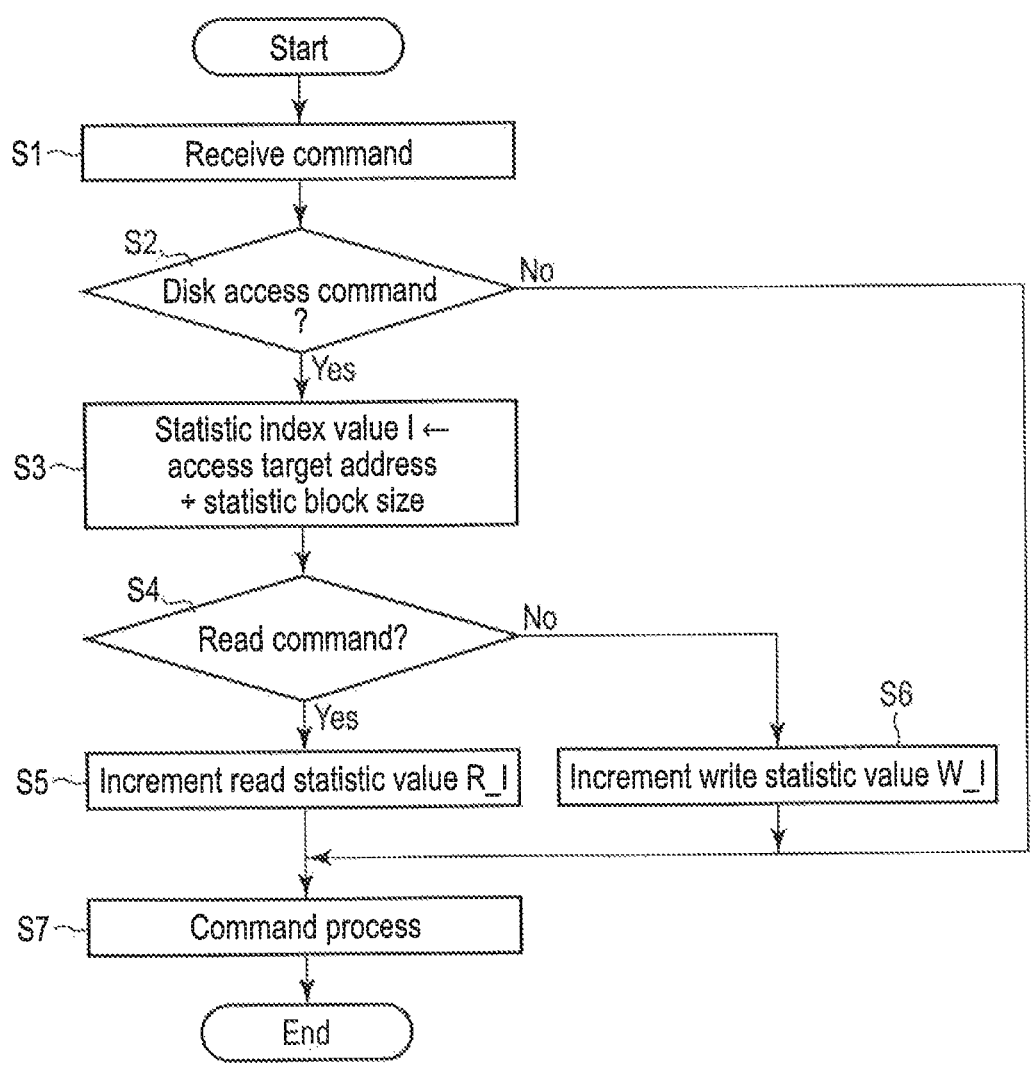
FIG. 9 is a flowchart showing a procedure of a command process including update of an access statistic value in the first embodiment.

Next, a command process including update of the access statistic value (write statistic value W_I or read statistic value R_I) in the first embodiment will be described with reference to FIG. 9. FIG. 9 is a flowchart showing a procedure of the command process.

When the storage controller 21 receives a command from the host 20 (Step S1), the storage controller 21 determines whether the received command is a disk command (Step S2). If the received command is the disk access command (Yes in Step S2), the command includes a logical address (i.e., access target address) which designates a target to be accessed.

When the received command is the disk access command (Yes in Step S2), the access controller 214 of the storage controller 21 calculates a statistic index value I indicative of a statistic block of the target to be accessed based on the access target address included in the received command (Step S3). To simplify the explanation, it is assumed that an access range equal to a size of a statistic block, and the access range does not extend over two statistic blocks. In this case, the statistic index value I is calculated by dividing the access target address by the statistic block size.

Next, the storage controller 21 determines whether the received command (disk access command) is a read command (Step S4). If the received command is the read command (Yes in Step S4), the access statistic collection unit 212 of the storage controller 21 increments, by one, a read statistic value R_I stored in the AST 215a in association with the statistic index value I calculated in Step S3 (Step S5). On the other hand, if the received command is a write command (No in Step S4), the access statistic collection unit 212 increments, by one, a write statistic value W_I stored in the AST 215a in association with the statistic index value I calculated in Step S3 (Step S6).

After the access statistic collection unit 212 executes step S5 or S6, the storage controller 21 (more specifically, access controller 214 of storage controller 21) executes a process (disk access process) designated by the received command (i.e., read command or write command) (Step S7). On the other hand, if the received command is not the disk access command (No in Step S2), the storage controller 21 skips steps S4 to S6, and executes a process (a process which is different from disk access) designated by the received command (Step S7). In the first embodiment, the read statistic value R_I is not always necessary. Therefore, Step S5 is not always necessary.

Second Embodiment

FIG. 10 is a block diagram showing an exemplary hardware configuration of a storage system including a storage device according to a second embodiment. The storage system shown in FIG. 1 includes a storage device 100, a host computer (hereinafter, referred to as a host) 200 and a network 300. The storage device 100 is connected to the host 200 via the network 300. The host 200 utilizes the storage device 100 as an external memory.

The storage device 100 includes a plurality of SSDs, e.g., four SSDs 110-1 (#1) to 110-4 (#4), a plurality of HDDs, e.g., four HDDs 120-1 (#1) to 120-4 (#4) and a storage controller 130. Unlike the storage controller 21 of the first embodiment, the storage controller 130 is provided independently from host 200. The storage controller 130 is connected to the SSDs 110-1 to 110-4 and the HDDs 120-1 to 120-4, and controls the SSDs 110-1 to 110-4 and the HDDs 120-1 to 120-4.

The storage controller 130 utilizes at least one storage area of the SSDs 110-1 to 110-4 and the HDDs 120-1 to 120-4, and defines an LU 150 which can be recognized from the host 200. In an example shown in FIG. 10, storage areas of the SSD 110-1 and the HDD 120-1 are utilized to define the LU 150. The storage controller 130 defines a physical memory 140 which provides physical address areas (physical areas) allocated to logical address areas (logical areas) of the LU 150. In the example shown in FIG. 10, the physical memory 140 is an array (disk array) comprising the SSD 110-1 and the HDD 120-1.

FIG. 11 is a block diagram mainly showing an exemplary function configuration of the storage controller 130 shown in FIG. 10. In FIG. 11, the elements equivalent to those shown in FIG. 2 are the denoted by the same reference numerals. The configuration of the storage controller 130 shown in FIG. 11 will be described with a focus on points different from the configuration of the storage controller 21 shown in FIG. 2.

Like the storage controller 21 shown in FIG. 2, the storage controller 130 includes a LU management unit 211, an access statistic collection unit 212, a selection unit 213, an access controller 214 and a management data storage unit 215. Unlike the first embodiment, the LU management unit 211 includes a mapping unit 211a.

The mapping unit 211a allocates (associates) a drive (physical disk) in the physical memory 140, i.e., the SSD 110-1 or the HDD 120-1 to (with) each of logical address areas of units of mapping in the LU 150. The association between the logical address area of the LU 150 and the drive in the physical memory 140 is called mapping. More specifically, for each of logical address areas of units of mapping in LU 150, the mapping unit 211a associates, by mapping, the logical address area with a drive allocated to the logical address area and a logical address area (hereinafter, referred to as a drive logical address area) recognized by that drive. When an SSD is allocated to a logical address area (logical address) of the LU 150, a drive logical address area (drive logical address) associated with the logical address area (logical address) is called an SSD logical address area (SSD logical address). When an HDD is allocated to a logical address area (logical address) of the LU 150, a drive logical address area (drive logical address) associated with that logical address area (logical address) is called an HDD logical address area (HDD logical address). The first embodiment corresponds to a case where all of logical addresses of the LU 150 are equal to SSD logical addresses.

The mapping unit 211a dynamically changes mapping between the logical address area of the LU 150 and the drive based on an access frequency for each unit of mapping of the LU 150. It is assumed that utilizing a function (i.e., remapping function) for changing the mapping, the mapping unit 211a re-allocates the SSD 110-1 (i.e., SSD 110-1 having fast access speed) to a logical address area having high access frequency, and re-allocates an HDD 120-1 (i.e., HDD 120-1 having slow access speed) to a logical address area having a low access frequency. In this case, it is expected that the access speed of the entire LU 150 (storage device 100) is enhanced.

However, according to the above-described remapping, there is a possibility that memory blocks having high write frequencies and memory blocks having high read frequencies are mixed in the SSD 110-1. There is a possibility that the memory blocks having the high read frequencies include memory blocks having low write frequencies. In such a case, a defragmentation process is generated often in the SSD 110-1, and the access speed of the SSD 110-1 decreases.

Hence, based on the write statistic values W_I and the read statistic values R_I, the mapping unit 211a executes remapping for preventing the defragmentation process from being generated often in the SSD 110-1. In order for the rewrite unit 214a to execute the rewriting accompanying the remapping, the selection unit 213 selects logical address areas in units of mapping based on the write statistic values W_I and the read statistic values R_I.

In addition to the AST 215a, a mapping table (hereinafter, referred to as an MT) 215b is stored in the management data storage unit 215. Each of entries of the MT 215b is used for storing information (i.e., mapping information) indicating an association among a logical address (i.e., statistic index value I of statistic block SB) of a unit of mapping of the LU 150, a drive (SSD 110-1 or HDD 120-1) allocated to a logical address area (statistic block SB) of that logical address (statistic index value I), and a drive logical address (SSD logical address or HDD logical address).

Figure 12:
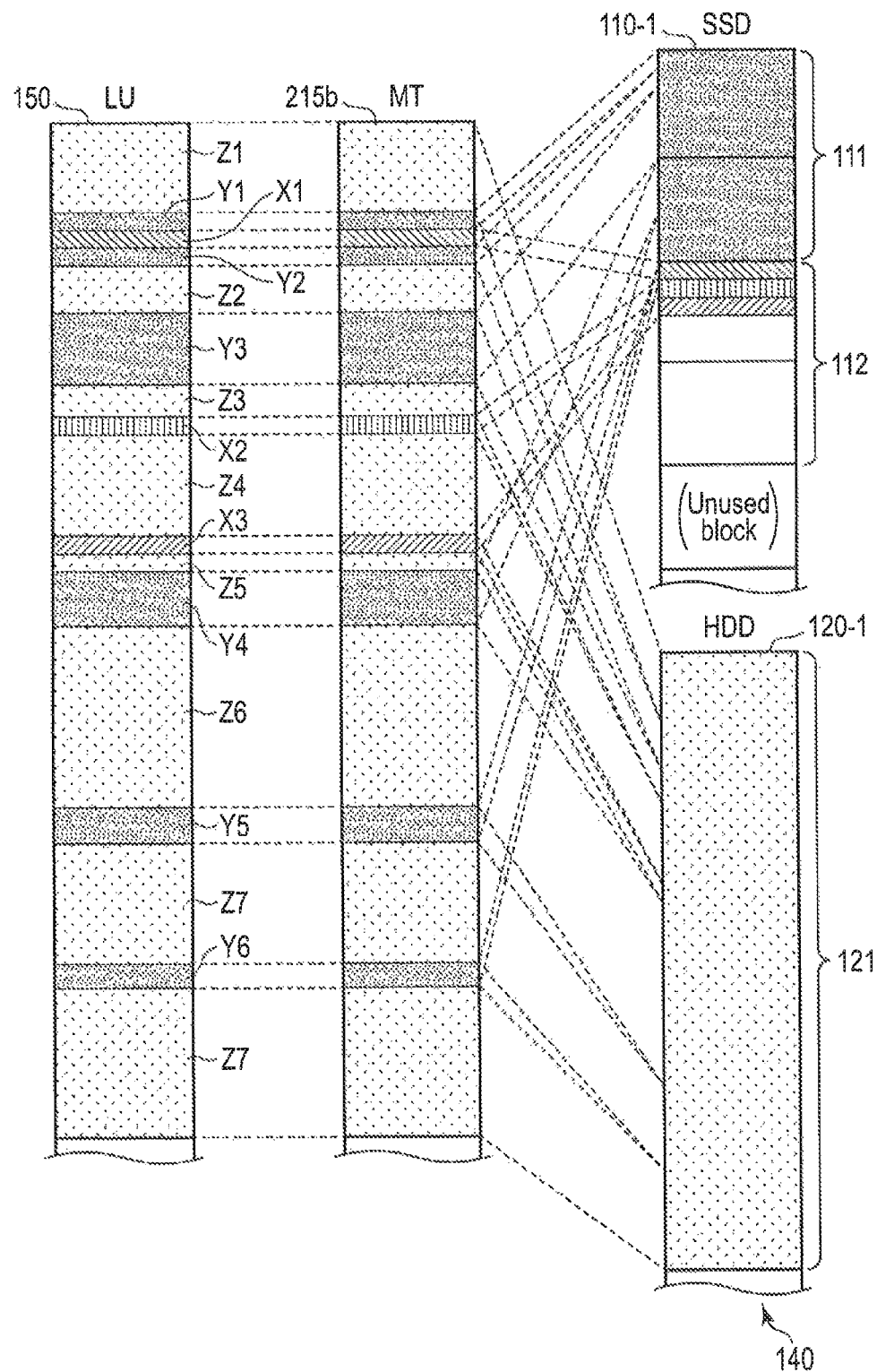
FIG. 12 is a diagram for explaining a remapping process in the second embodiment.
Figure 13:
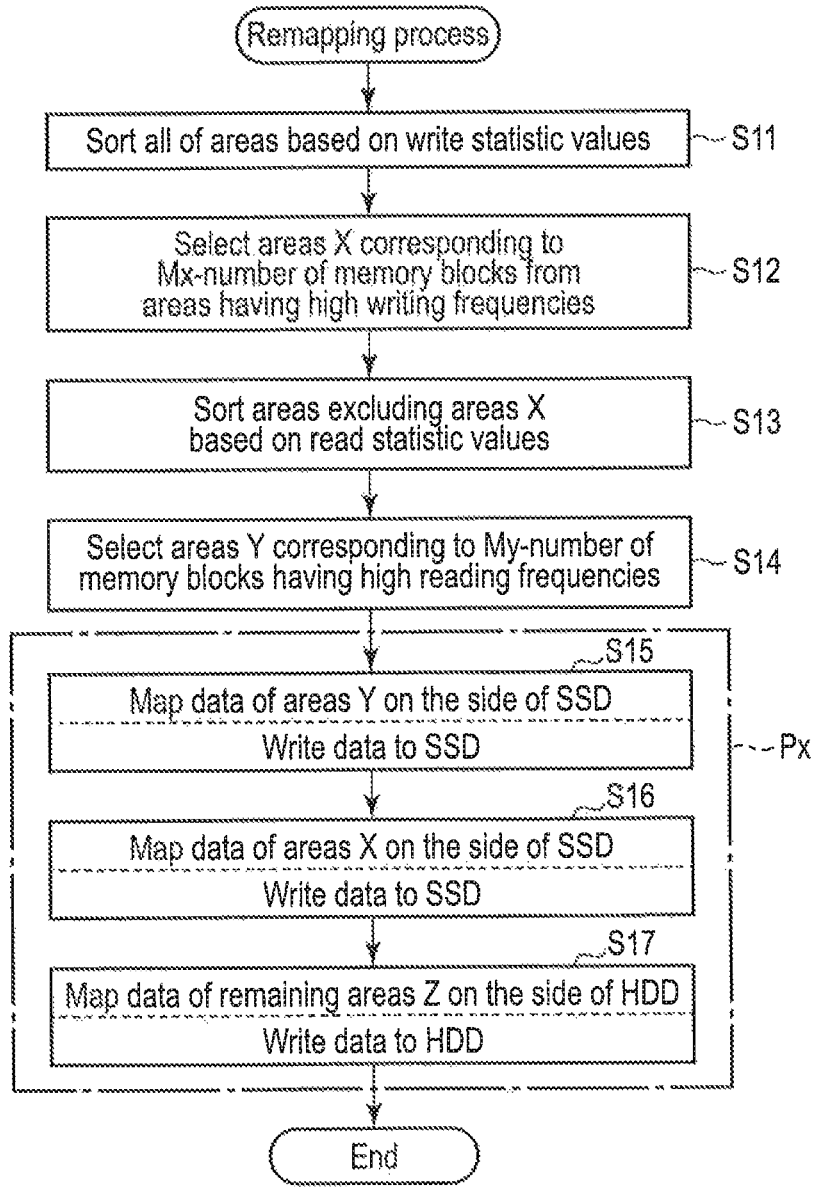
FIG. 13 is a flowchart showing a procedure of the remapping process.

Next, an example of a remapping process (i.e., data relocation process) in the second embodiment will be described with reference to FIGS. 12 and 13. FIG. 12 is a diagram for explaining the remapping process. FIG. 13 is a flowchart showing a procedure of the remapping process.

In FIG. 12, logical address areas X1, X2 and X3 in the LU 150 are logical address areas having high write frequencies. Reading frequencies of the logical address areas X1 to X3 may be high or low. A total size of logical address areas having high write frequencies (hereinafter, referred to as second logical address areas) including the logical address areas X1 to X3, for example, is equal to a total size of Mx-number of (here, Mx=2) memory blocks. In FIG. 12, logical address areas having high write frequencies excluding the logical address areas X1 to X3 are omitted.

Logical address areas Y1, Y2, Y3, Y4, Y5 and Y6 in the LU 150 are logical address areas having high read frequencies and low write frequencies (hereinafter, referred to as first logical address areas). A total size of the first logical address areas Y1 to Y6, for example, is equal to a total size of My-number of (here, My=2) memory blocks.

Logical address areas Z1, Z2, Z3, Z4, Z5, Z6 and Z7 in the LU 150 are logical address areas (hereinafter, referred to as third logical address areas) in the LU 150 excluding the second logical address areas and the first logical address areas Y1 to Y6. That is, the third logical address areas Z1 to Z7 are logical address areas having low read frequencies and low write frequencies.

Whenever a statistic collection period is elapsed, the remapping process is executed in the following manner according to a procedure shown in a flowchart in FIG. 13. First, the selection unit 213 sorts all areas (i.e., all of statistic blocks SB) of the LU 150 in ascending order of write statistic values W_I of units of mapping which are stored in the AST 215a (Step S11). Based on a result of the sorting of the write statistic values W_I, the selection unit 213 selects logical address areas X of an amount corresponding to Mx-number of (Mx=2) memory blocks in decreasing order of the write statistic values W_I (i.e., in decreasing order of write frequencies) (Step S12). Here, second logical address areas including the logical address areas X1 to X3 are selected as the logical address areas X.

Next, the selection unit 213 sorts areas of the LU 150 excluding the selected logical address areas X (i.e., second logical address areas having high write frequencies) in ascending order of the read statistic values R_I of units of mapping which are stored in the AST 215a (Step S13). Based on a result of the sorting of the read statistic values R_I, the selection unit 213 selects logical address areas Y of an amount corresponding to My-number of (My=2) memory blocks in decreasing order of the read statistic values R_I (in decreasing order of read frequencies) (Step S14). Here, the first logical address areas Y1 to Y6 having high read frequencies and low write frequencies are selected as logical address areas Y.

Then, the mapping unit 211a and the rewrite unit 214a execute a process Px including steps S15 to S17 in the following manner. First, the mapping unit 211a re-allocates (remaps) the SSD 110-1 to logical addresses of the logical address areas Y (i.e., first logical address areas Y1 to Y6) selected in Step S14 (Step S15). That is, the mapping unit 211a allocates the SSD 110-1 and the first SSD logical addresses (e.g., continuous first SSD logical addresses) to the first logical address areas Y1 to Y6 by updating the MT 215b.

In Step S15, the rewrite unit 214a rewrites data written in the first logical address areas Y1 to Y6 (more specifically, drives allocated to the first logical address areas Y1 to Y6 before remapping) to SSD 110-1 newly allocated to the first logical address areas Y1 to Y6 by the remapping. According to this operation, data of the first logical address areas Y1 to Y6 is relocated in a physical address area 111 comprising My-number of (My=2) continuous memory blocks in the SSD 110-1 as shown in FIG. 12.

Next, the mapping unit 211a remaps SSD 110-1 to logical addresses of the logical address areas X (i.e., second logical address areas having high write frequencies including logical address areas X1 to X3) selected in Step S12 (Step S16). That is, the mapping unit 211a allocates the SSD 110-1 and the second SSD logical addresses (e.g., continuous second SSD logical addresses succeeding the continuous first SSD logical addresses) to the second logical address areas including the logical address areas X1 to X3 by updating the MT 215b.

In Step S16, the rewrite unit 214a rewrites data written in the second logical address areas (more specifically, physical address areas allocated to the second logical address areas before remapping) to the SSD 110-1 newly allocated to the second logical address areas by the remapping. According to this operation, data of the second logical address areas (i.e., logical address areas having high write frequencies including the logical address areas X1 to X3) is relocated in a physical address area 112 comprising Mx-number of (Mx=2) continuous memory blocks in the SSD 110-1 as shown in FIG. 12. Since Step S16 is executed after Step S15, the physical address area 112 generally follows after the physical address area 111.

Next, the mapping unit 211a remaps the HDD 120-1 to logical addresses of remaining logical address areas Z (i.e., third logical address areas Z1 to Z7) in the LU 150 which were not selected in any of steps S12 and S14 (Step S17). That is, the mapping unit 211a allocates the HDD 120-1 and the HDD logical addresses (e.g., continuous HDD logical addresses) to the third logical address areas Z1 to Z7 by updating the MT 215b.

In Step S17, the rewrite unit 214a rewrites data written in the third logical address areas Z1 to Z7 (more specifically, physical address areas allocated to the third logical address areas Z1 to Z7 before remapping) to the HDD 120-1 newly allocated to the third logical address areas Z1 to Z7 by remapping. According to this operation, data of the third logical address areas Z1 to Z7 is relocated in a physical address area 121 in the HDD 120-1 as shown in FIG. 12. Then, the remapping process is completed.

According to the second embodiment, the physical address area 111 in the SSD 110-1 is transited to an area (set of memory blocks) having high read frequency but low write frequency by the execution of the remapping process. That is, the physical address area 111 in the SSD 110-1 is transited to an area where data is read frequently but writing (update) of data is less prone to be generated. Therefore, areas of invalid data are less prone to be generated in the physical address area 111. Hence, according to the second embodiment, it is possible to reduce a frequency of execution of the defragmentation process in the SSD 110-1 and to prevent a decrease of the access speed of the SSD 110-1, that is, a decrease of the access speed of the entire storage device 100 (LU 150).

Further, According to the second embodiment, the physical address area 112 in the SSD 110-1 is transited to an area (set of memory blocks) having high write frequency by the execution of the remapping process. That is, the physical address area 112 in the SSD 110-1 is transited to an area where writing (update) of data is frequently generated. As described above, according to the second embodiment, a physical address area of the SSD 110-1 can be used as an area having high write frequency or high read frequency (i.e., high access frequency). Therefore, it is possible to enhance the access speed of the entire storage device 100 (LU 150).

Further, according to the second embodiment, the physical address area 121 in the HDD 120-1 is transited to an area (set of sectors) having low read frequency and low write frequency by the execution of the remapping process. That is, the physical address area 121 in the HDD 120-1 is transited to an area where access is less prone to be generated. According to the second embodiment, it is possible to prevent the access speed of the entire storage device 100 (LU 150) from decreasing by the access to the HDD 120-1.

In the second embodiment, the storage controller 130 is provided independently from the host 200, and the storage controller 130 is connected to the host 200 via the network 300. However, the storage controller 130 may be provided in the host 200 like the storage controller 21 in the first embodiment.

Modification of Second Embodiment

Next, a modification of the second embodiment will be described. In the second embodiment, the remapping process is executed using the SSD 110-1 which is being used. However, the remapping process may be executed using an SSD (e.g., spare SSD) which is in an unused state (so-called unmapped state). The modification of the second embodiment is characterized in that when the spare SSD exists, the remapping is executed using the spare SSD. The process Px in a flowchart in FIG. 13 is changed by a configuration of the storage device 100.

A summary of the modification will be described with reference to FIGS. 10 and 11 for convenience. Generally, a storage device including a plurality of SSDs and HDDs includes a spare SSD or a spare HDD in some cases. The storage device 100 shown in FIG. 10, for example, can also use one of the SSDs 110-1 to 110-4 or one of the HDDs 120-1 to 120-4 as a spare SSD or HDD.

As shown in FIG. 10, it is assumed that a physical memory 140 comprises the SSD 110-1 and the HDD 120-1, and that the SSD 110-1 and the HDD 120-1 are being used as in the second embodiment. In this state, if a spare SSD exists in SSDs connected to the storage controller 130, the mapping unit 211a unmaps the entire area of the spare SSD by erasing for each unit of mappings. That is, the mapping unit 211a brings the entire area of the spare SSD into a free state. The rewrite unit 214a copies data from the SSD 110-1 and the HDD 120-1 to the spare SSD which is in an unmapped state. A process (first process) executed when the spare SSD exists is called a process Pa.

On the other hand, if a sufficient free area exists in the HDD 120-1 although a spare SSD does not exist, the rewrite unit 214a copies data in an area which is mapped in the SSD 110-1 to the free area of the HDD 120-1. After the data is copied, the mapping unit 211a unmaps the entire area of the SSD 110-1. Then, the rewrite unit 214a copies data from the HDD 120-1 to the SSD 110-1 which is in the unmapped state. A process (second process) executed when a sufficient free area exists in the HDD 120-1 is called a process Pb. On the other hand, if a sufficient free area does not exist in the HDD 120-1, a process similar to that of the second embodiment is executed.

Next, details of the modification will be described. Here, unlike the above-described summary, it is assumed that a physical memory comprises a plurality of SSDs (e.g., two SSDs 110-1 and 110-2) and a plurality of HDDs (e.g., two HDDs 120-1 and 120-2). It is assumed that an LU 151 (see FIG. 14) corresponding to the LU 150 shown in FIG. 10 is defined utilizing storage areas of the SSDs 110-1 and 110-2 and the HDDs 120-1 and 120-2 (i.e., the same number of HDDs as that of the SSDs). If necessary, the LU 150 is replaced by the LU 151 in FIG. 10, and the SSD 110-1 and the HDD 120-1 associated with the LU 151 are replaced by the SSDs 110-1 and 110-2 and the HDDs 120-1 and 120-2. A first physical memory (array) may comprise the SSDs 110-1 and 110-2, and a second physical memory (array) may comprise the HDDs 120-1 and 120-2.

FIG. 14 is a diagram for explaining striping for each unit of mapping in a case where the LU 151 is defined utilizing storage areas of the SSDs 110-1 and 110-2 and the HDDs 120-1 and 120-2. An area of the LU 151 is associated with the SSDs 110-1 and 110-2 or the HDDs 120-1 and 120-2 for each unit of mapping.

An area 141 of a certain one unit of mapping shown in FIG. 14 for example is mapped in the SSDs 110-1 and 110-2. The area 141 mapped in the SSDs 110-1 and 110-2 is striped into stripe blocks of a predetermined size in the SSDs 110-1 and 110-2. Another area 142 of one unit of mapping shown in FIG. 14 is mapped in the HDDs 120-1 and 120-2. That is, the area 142 is striped into the stripe blocks in the HDDs 120-1 and 120-2.

Figure 16:
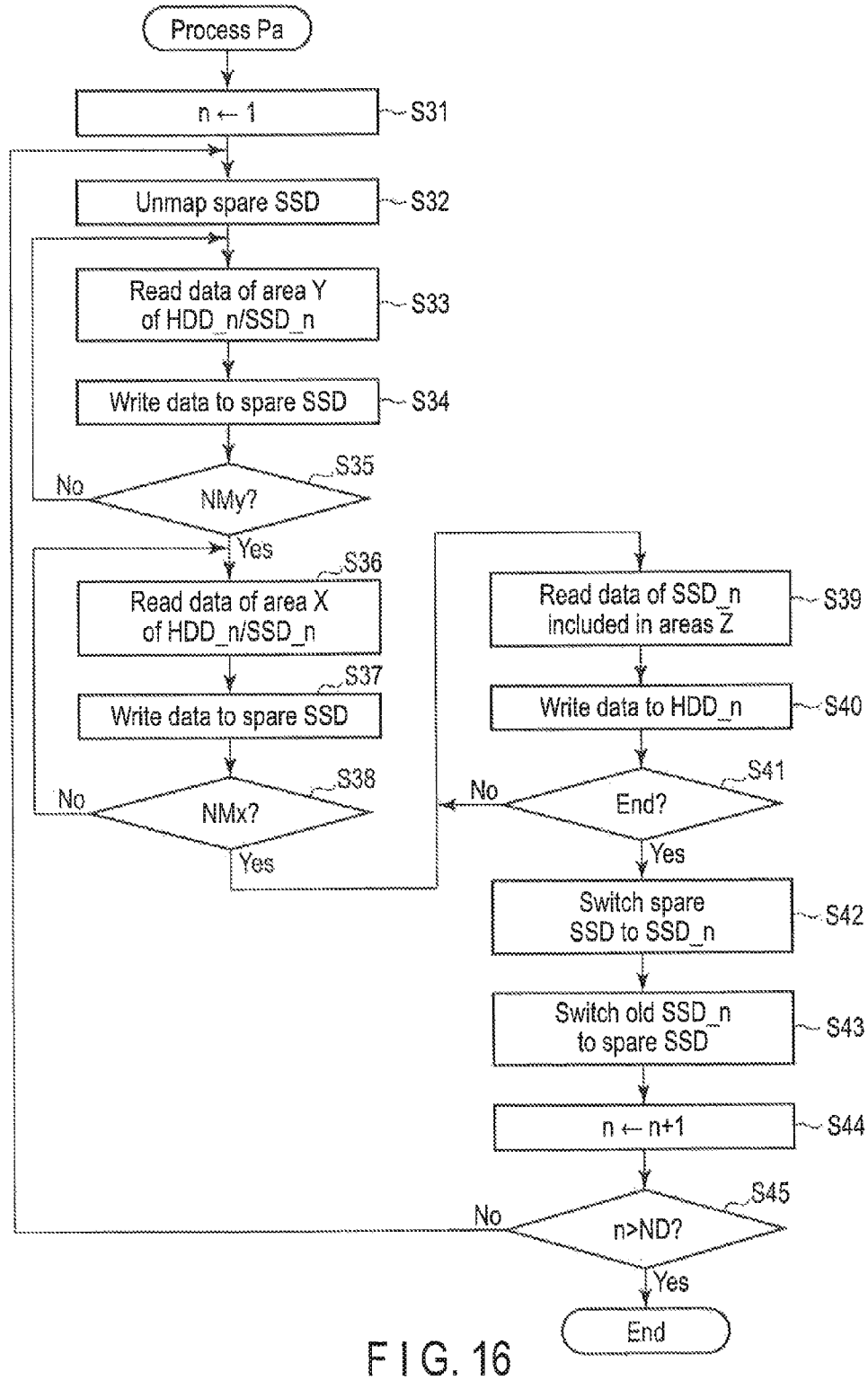
FIG. 16 is a flowchart showing a procedure of first process in the rewriting process shown in FIG. 15.
Figure 17:
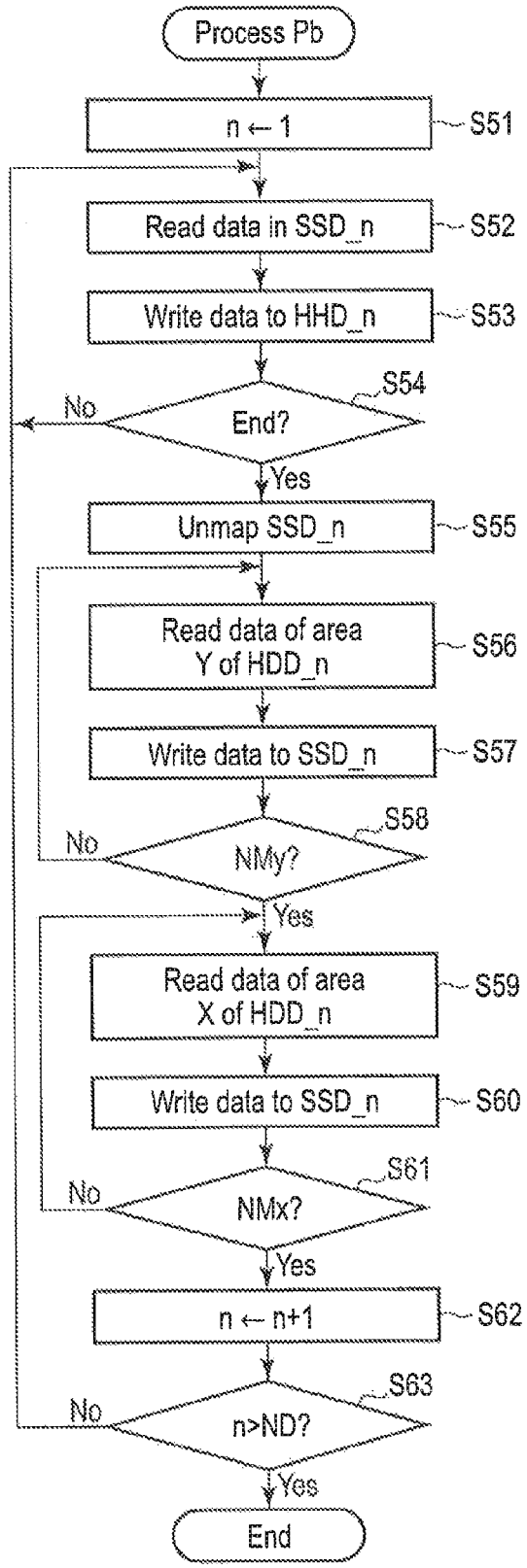
FIG. 17 is a flowchart showing a procedure of second process in the rewriting process shown in FIG. 15.

Next, a process (hereinafter, referred to as a rewriting process) which is applied to the modification of the second embodiment and which corresponds to the process Px will be described with reference to flowcharts shown in FIGS. 15 to 17. FIG. 15 is the flowchart showing a procedure of the entire rewriting process. FIG. 16 is the flowchart showing a procedure of the process Pa (first process) in the rewriting process. FIG. 17 is the flowchart showing a procedure of the process Pb (second process) in the rewriting process.

Here, as shown in FIG. 14, the LU 151 is defined utilizing storage areas of the SSDs 110-1 and 110-2 and the HDDs 120-1 and 120-2. In the following description, two SSDs allocated to the area of the LU 151 are expressed as an SSD_1 and an SSD_2. Of the two SSDs, the n-th SSD is expressed as an SSD_n. Similarly, two HDDs 2 allocated to another area of the LU 151 are expressed as an HDD_1 and an HDD_2. Of the two HDDs, n-th HDD is expressed as an HDD_n.

As described above, the rewriting process shown in the flowchart of FIG. 15 corresponds to the process Px in the flowchart of FIG. 13. Therefore, the rewriting process is executed after Step S14 in the flowchart of FIG. 13.

First, the mapping unit 211a determines whether a spare SSD (more specifically, free spare SSD) exists in SSDs connected to the storage controller 130 (Step S21). If the spare SSD exists (Yes in Step S21), the mapping unit 211a executes the process Pa in cooperation with the rewrite unit 214a (Step S22). Here, it is assumed that the spare SSD is an SSD 110-3 or an SSD 110-4.

On the other hand, if the spare SSD does not exist (No in Step S21), the mapping unit 211a determines whether sufficient free areas exist in the HDDs (more specifically, HDD_1 and HDD_2) (Step S23). The sufficient free areas means free areas required for copying data of an SSD_1 and an SSD_2 (i.e., data of address area of the LU 151 mapped in SSD_1 and SSD_2). If there are the sufficient free areas in the HDD_1 and the HDD_2 (Yes in Step S23), the mapping unit 211a executes the second process Pb in cooperation with the rewrite unit 214a (Step S24).

On the other hand, if there are not sufficient free areas in the HDD_1 and the HDD_2 (No in Step S23), the mapping unit 211a executes a process similar to the process Px shown in FIG. 13 in cooperation with the rewrite unit 214a. If necessary, the SSD is replaced by the SSD_1 and the SSD_2, and the HDD is replaced by the HDD_1 and the HDD_2 in the process Px.

Next, the process Pa will be described with reference to the flowchart of FIG. 16. First, the mapping unit 211a sets a variable n which specifies an SSD and an HDD to an initial value 1 (Step S31). Next, the mapping unit 211a selects a spare SSD (i.e., free spare SSD) as a transfer destination (copy destination) of data, and unmaps the entire area of the spare SSD (Step S32). According to this operation, data of the entire area of the spare SSD is erased. In Step S32, the mapping unit 211a selects the SSD_n and the HDD_n as transfer sources (copy sources) of data. Here, since n is equal to 1, the SSD_1 and the HDD_1 are selected as the transfer sources of data.

The rewrite unit 214a reads data (i.e., striped data) of physical address areas in the SSD_n and the HDD_n which are allocated to a logical address area Y in the LU 12 from the SSD_n and the HDD_n, for example, in ascending order of logical addresses and for each of mapping (i.e., statistic block SB) (Step S33). The logical address area Y has high a read frequency and a low write frequency. The rewrite unit 214a writes the read data in the spare SSD (i.e., spare SSD of sending destination) (Step S34). The rewrite unit 214a repeats steps S33 and S34 until the number of units of mapping in which reading/writing are executed reaches a number NMy corresponding to a total size of the logical address areas Y (Step S35). That is, the rewrite unit 214a executes the reading/writing of data of the logical address areas Y1, Y2, Y3, Y4, Y5 and Y6.

The mapping unit 211a remaps using the MT 215b at the time of the above-described writing executed by the rewrite unit 214a. For example, when data read from a logical address area Y1 is written, the mapping unit 211a allocates a spare SSD and an SSD logical address SLBA0 to a logical address LBAy1 of the logical address area Y1. The SSD logical address SLBA0, for example, is 0. In this case, the rewrite unit 214a requests the spare SSD for writing of data read from the logical address area Y1 by designating the SSD logical address SLBA0 as a writing destination. Similarly, the mapping unit 211a allocates the spare SSD and an SSD logical address SLBA1 to a logical address LBAy2 of the logical address area Y2 when data read from the logical address area Y2 is written. The SSD logical address SLBA1 follows after the SSD logical address SLBA0. In this case, the rewrite unit 214a requests the spare SSD for writing of data read from the logical address area Y2 by designating the SSD logical address SLBA1 as a writing destination.

Similarly, when data read from a logical address area Y3 is written, the mapping unit 211a allocates the spare SSD and continuous SSD logical addresses SLBA2, SLBA3 and SLBA4 to continuous logical addresses LBAy3a, LBAy3b and LBAy3c of the logical address area Y3. The SSD logical address SLBA2 follows after the SSD logical address SLBA1. In this case, the rewrite unit 214a requests the spare SSD for writing of data read from the logical address area Y3 by designating the SSD logical address SLBA2 as a writing destination (starting address of writing destination). Similarly, when data read from a logical address area Y4 is written, the mapping unit 211a allocates the spare SSD and continuous SSD logical addresses SLBA5 and SLBA6 to continuous logical addresses LBAy4a and LBAy4b of the logical address area Y4. The SSD logical address SLBA5 follows after the SSD logical address SLBA4. In this case, the rewrite unit 214a requests the spare SSD for writing of data read from the logical address area Y4 by designating the SSD logical address SLBA5 as a writing destination (starting address of writing destination).

Similarly, when data read from the logical address area Y5 is written, the mapping unit 211a allocates the spare SSD and an SSD logical address SLBA7 to the logical address LBAy5 of the logical address area Y5. The SSD logical address SLBA7 follows after the SSD logical address SLBA6. In this case, the rewrite unit 214a requests the spare SSD for writing of data read from the logical address area Y5 by designating the SSD logical address SLBA7 as a writing destination. Similarly, when data read from the logical address area Y6 is written, the mapping unit 211a allocates the spare SSD and an SSD logical address SLBA8 to the logical address LBAy6 of the logical address area Y6. The SSD logical address SLBA8 follows after the SSD logical address SLBA7. In this case, the rewrite unit 214a requests the spare SSD for writing of data read from the logical address area Y6 by designating the SSD logical address SLBA8 as a writing destination.

By the above-described rewriting, data read from the logical address areas Y (logical address areas Y1 to Y6) is relocated in areas of continuous physical addresses of the SSD_n. Here, since the SSD_n is unmapped in Step S32, it is expected that the read data is relocated, for example, in areas of continuous physical addresses starting from a physical address 0 of the SSD_n.

Next, the rewrite unit 214a reads data (striped data) of physical address areas in the SSD_n and the HDD_n which are allocated to a logical address area X in the LU 12 from the SSD_n and the HDD_n, for example, in ascending order of logical addresses and for each unit of mapping (Step S36). The logical address area X has a high write frequency. The rewrite unit 214a writes the read data to the spare SSD (Step S37). The rewrite unit 214a repeats steps S36 and S37 until the number of units of mapping in which rewriting/writing is executed reaches a total size of the logical address areas X (Step S38).

When data read from the logical address areas X is written to the spare SSD also, mapping similar to that of the writing of data read from the logical address areas Y to the spare SSD is executed. Here, an SSD logical address SLBA9 is allocated to a top logical address of the logical address areas Y. The SSD logical address SLBA9 follows after the SSD logical address SLBA8 allocated to the last logical address of the logical address areas X. In this case, it is expected that data read from the logical address areas X is relocated to areas of physical addresses which follows after areas of continuous physical addresses starting from a physical address 0 of the SSD_n.

Next, of data of the physical address areas allocated to a remaining logical address area Z in the LU 12, the rewrite unit 214a reads data (striped data) of the physical address area in the SSD_n from the SSD_n, for example, in the order of logical addresses and for each unit of mapping (Step S39). The logical address area Z has a low read frequency and a low write frequency. The rewrite unit 214a writes the read data to the HDD_n (Step S40). The rewrite unit 214a repeats steps S39 and S40 for all of the logical address areas Z (Step S41).

Also, when data read from the SSD_n and included in data of the physical address areas allocated to the logical address areas Z is written to the HDD_n, the mapping unit 211a executes mapping similar to that when data is written to the spare SSD. For example, the mapping unit 211a allocates a top HDD logical address of HDD logical address areas which is in a free state to a top logical address of the logical address areas Z.

If steps S39 and S40 are repeated for all of the logical address areas Z (Step S41), the mapping unit 211a switches the spare SSD to an SSD_n (i.e., new SSD_n) (Step S42). The mapping unit 211a switches the SSD_n (i.e., old SSD_n) before switching to a spare SSD (Step S43).

Next, the mapping unit 211a increments the variable n by one (Step S44). Here, n is incremented from one to two. The mapping unit 211a determines whether the incremented variable n (=2) exceeds the number ND of SSDs (=the number of HDDs) used for defining the LU 150 (Step S45). Here, ND is two. If n (=2) does not exceed ND (=2) as in this example (No in Step S45), the mapping unit 211a again executes steps S32 to S45 in cooperation with the rewrite unit 214a.

By the above-described operation, when n is one, data corresponding to the logical address areas Y is read from the SSD_1 and the HDD_1, and the data is written to the spare SSD. Next, data corresponding to the logical address areas X is read from the SSD_1 and the HDD_1, and the data is written to the spare SSD. Next, data corresponding to the remaining logical address areas Z is read from the SSD_1, and the data is written to the HDD_1. The spare SSD is switched to a new SSD_1, and the old SSD_1 is switched to the spare SSD. Then, n is incremented from one to two.

In a state where n is two as described above, data corresponding to the logical address areas Y is read from the SSD_2 and the HDD_2, and the data is written to the spare SSD (i.e., old SSD_1). Here, the spare SSD (old SSD_1) is unmapped before rewriting/writing. Next, data corresponding to the logical address areas X is read from the SSD_2 and the HDD_2, and the data is written to the spare SSD (old SSD_1). Next, data corresponding to the remaining logical address areas Z is read from the SSD_2, and the data is written to the HDD_2. Then, the spare SSD (old SSD_1) is switched to a new SSD_2, and the old SSD_2 is switched to the spare SSD. Then, n is incremented from two to three. If n (=3) exceeds ND (=2) (Yes in Step S45), the process Pa shown in the flowchart in FIG. 16 is completed.

According to this process Pa, it is possible to reliably realize data relocation similar to that shown in FIG. 12 by utilizing the spare SSD. However, the data relocation shown in FIG. 12 corresponds to a case where ND is one in the process Pa.

Next, the process Pb will be described with reference to the flowchart in FIG. 17. First, the mapping unit 211a sets the variable n which specifies an SSD and an HDD to an initial value 1 (Step S51). Since a spare SSD does not exist, the rewrite unit 214a copies (saves) data (more specifically, effective data) in the SSD_n to the HDD_n according to the following procedure. First, the rewrite unit 214a reads, for example, in ascending order of logical addresses and on for each unit of mapping, data (effective data) from a physical area of an SSD_n which is allocated to a logical address area in the LU 12 where the SSD_n is mapped (Step S52). The rewrite unit 214a writes the read data to the HDD_n (Step S53). According to this operation, data is copied from the SSD_n to the HDD_n. The rewrite unit 214a repeats steps S52 and S53 in order of the logical addresses until all of the effective data in the SSD_n is copied (Step S54).

If the data copy from the SSD_n to the HDD_n is completed, the mapping unit 211a unmaps the SSD_n (Step S55). In Step S55, the mapping unit 211a maps (allocates) the HDD_n to logical address areas (units of mapping) of the LU 150 where the SSD_n is mapped before the SSD_n is unmapped. Then, the rewrite unit 214a reads, for example, in ascending order of logical addresses and for each unit of mapping, data of a physical address area in an HDD_n which is allocated to a logical address area Y in the LU 12 from the HDD_n (Step S56). The logical address area Y has a high read frequency and a low write frequency. There is a possibility that the read data includes data which is copied from the SSD_n to the HDD_n before the SSD_n is unmapped. The rewrite unit 214a writes the read data to the SSD_n (SSD_n which is in an unmapped state) (Step S57). The rewrite unit 214a repeats steps S56 and S57 until the number of units of mapping in which rewriting/writing is executed reaches a number NMy corresponding to a total size of the logical address areas Y (Step S58).

Next, the rewrite unit 214a reads data of a physical address area in the HDD_n which is allocated to a logical address area X in the LU 12, for example, in ascending order of logical addresses and for each unit of mapping (Step S59). The logical address area X has a high write frequency. The rewrite unit 214a writes the read data to the SSD_n (Step S60). The rewrite unit 214a repeats steps S59 and S60 until the number of units of mapping in which rewriting/writing is executed reaches a number NMx corresponding to a total size of the logical address areas X (Step S61).

Next, the mapping unit 211a increments the variable n by one (Step S62). Here, n is incremented from one to two. The mapping unit 211a determines whether the incremented variable n (=2) exceeds a number ND of SSDs (i.e., number of HHDs) used for defining the LU 150 (Step S63). Here, ND is two.

If n (=2) does not exceeds ND (=2) as in this example (No in Step S63), the mapping unit 211a again executes steps S52 to S63 in cooperation with the rewrite unit 214a. If n exceeds ND on the other hand (Yes in Step S63), the process Pb shown in the flowchart in FIG. 17 is completed.

According to the process Pb, if a sufficient free area exists in HDDs (here, HDD_1 and HDD_2) used for defining the LU 150, it is possible to reliably realize the same data relocation as that shown in FIG. 12 by utilizing the HDDs. However, the data relocation shown in FIG. 12 corresponds to a case where ND is one in the process Pb.

According to at least one embodiment described above, it is possible to provide a storage device, a storage controller and a method for relocating data to an SSD (solid state drive) such that a frequency of execution of a defragmentation process can be reduced in the SSD.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage apparatus comprising:
a first solid state drive; and
a storage controller configured to control the first solid state drive,
wherein the storage controller comprises
a logical unit management unit configured to define a logical unit including a logical area to which a physical area of the first solid state drive is allocated,
an access statistic collection unit configured to collect write frequencies of a plurality of logical address areas having a predetermined size which configure the logical area of the logical unit,
a selection unit configured to select, based on the write frequencies, a set of first logical address areas having low write frequencies and a set of second logical address areas excluding the set of the first logical address areas, respectively from the logical unit, and
a rewrite unit configured to execute first rewriting for collectively rewriting data of the set of the first logical address areas to the first solid state drive, and second rewriting for collectively rewriting data of the set of the second logical address areas to the first solid state drive.

2. The storage apparatus of claim 1, wherein the rewrite unit is configured to:
execute the first rewriting by logically overwriting data of a set of the first logical address areas on the set of the first logical address areas; and execute the second rewriting by logically overwriting data of a set of the second logical address areas on the set of the second logical address areas.

3. The storage apparatus of claim 2, wherein the selection unit is configured to select a predetermined number of logical address areas from the logical unit as a set of the first logical address areas in ascending order of the write frequencies.

4. The storage device of claim 2, further comprising a hard disk drive,
wherein:
the storage controller is configured to control the first solid state drive and the hard disk drive;
the logical unit management unit is configured to define the logical unit using the first solid state drive and the hard disk drive;
the access statistic value collection unit is configured to collect read frequencies of the logical address areas in addition to the write frequencies of the logical address areas;
the selection unit is configured to select a set of the first logical address areas, a set of the second logical address areas and a set of third logical address areas based on the write frequencies and the read frequencies, the set of the first logical address areas being a set of the logical address areas having low write frequencies and high read frequencies, the set of the second logical address areas being a set of the logical address areas having high write frequencies excluding the set of the first logical address areas, and the set of the third logical address areas being a set of the logical address areas excluding the set of the first logical address areas and the set of the second logical address areas; and
the rewrite unit is configured to execute third rewriting for collectively rewriting data of the set of the third logical address areas to the hard disk drive.

5. The storage apparatus of claim 4, wherein the selection unit is configured to:
select a predetermined second number of logical address areas from the logical unit as a set of the second logical address areas in decreasing order of the write frequencies; and
select, excluding the set of the second logical address areas, a predetermined first number of logical address areas from the logical unit as a set of the first logical address areas in decreasing order of the read frequencies.

6. The storage apparatus of claim 4, further comprising a second solid state drive as a spare solid state drive,
wherein:
the rewrite unit is configured to:
execute, instead of the first rewriting, fourth rewriting for collectively rewriting data of a set of the first logical address areas to the spare solid state drive;
execute, instead of the second rewriting, fifth rewriting for collectively rewriting data of a set of the second logical address areas to the spare solid state drive; and
execute, instead of the third rewriting, sixth rewriting for collectively rewriting, to the hard disk drive, data of a set of fourth logical address areas which is allocated to the first solid state drive and is included in a set of the third logical address areas; and
the logical unit management unit is configured to:
switch the second solid state drive to the first solid state drive as the spare solid state drive after the fourth rewriting, the fifth rewriting and the sixth rewriting; and
switch the solid state drive allocated to the logical unit from the first solid state drive to the second solid state drive.

7. The storage apparatus of claim 4, wherein the rewrite unit is configured to:
copy data of the first solid state drive to the hard disk drive at the time of the rewriting, then erase the data of the first solid state drive and after the erase, read data of a set of the first logical address areas from the hard disk drive, and execute, instead of the first rewriting, fourth rewriting for collectively rewriting the data of the set of the first logical address areas to the first solid state drive; and
read data of a set of the second logical address areas from the hard disk drive, and execute, instead of the second rewriting, fifth rewriting for collectively rewriting the data of the set of the second logical address areas to the first solid state drive.

8. The storage apparatus of claim 1, further comprising a hard disk drive,
wherein:
the storage controller is configured to control the first solid state drive and the hard disk drive;
the logical unit management unit is configured to define the logical unit using the first solid state drive and the hard disk drive;
the access statistic value collection unit is configured to collect read frequencies of the logical address areas in addition to the write frequencies of the logical address areas;
the selection unit is configured to select a set of the first logical address areas, a set of the second logical address areas and a set of third logical address areas based on the write frequencies and the read frequencies, the set of the first logical address areas being a set of the logical address areas having low write frequencies and high read frequencies, the set of the second logical address areas being a set of the logical address areas having high write frequencies excluding the set of the first logical address areas, and the set of the third logical address areas being a set of the logical address areas excluding the set of the first logical address areas and the set of the second logical address areas; and
the rewrite unit is configured to execute third rewriting for collectively rewriting data of the set of the third logical address areas to the hard disk drive.

9. A storage controller configured to control a first solid state drive, the storage controller comprising:
a logical unit management unit configured to define a logical unit including a logical area to which a physical area of the first solid state drive is allocated;
an access statistic collection unit configured to collect write frequencies of a plurality of logical address areas having a predetermined size which configure the logical area of the logical unit;
a selection unit configured to select, based on the write frequencies, a set of first logical address areas having low write frequencies and a set of second logical address areas excluding the set of the first logical address areas, respectively from the logical unit; and
a rewrite unit configured to execute first rewriting for collectively rewriting data of the set of the first logical address areas to the first solid state drive, and second rewriting for collectively rewriting data of the set of the second logical address areas to the first solid state drive.

10. The storage controller of claim 9, wherein the rewrite unit is configured to:

execute the first rewriting by logically overwriting data of a set of the first logical address areas on the set of the first logical address areas; and execute the second rewriting by logically overwriting data of a set of the second logical address areas on the set of the second logical address areas.

11. The storage controller of claim 10, wherein the selection unit is configured to select a predetermined number of logical address areas from the logical unit as a set of the first logical address areas in ascending order of the write frequencies.

12. The storage controller of claim 10, wherein:
the storage controller is configured to control the first solid state drive and a hard disk drive;
the logical unit management unit is configured to define the logical unit using the first solid state drive and the hard disk drive;
the access statistic value collection unit is configured to collect read frequencies of the logical address areas in addition to the write frequencies of the logical address areas;
the selection unit is configured to select a set of the first logical address areas, a set of the second logical address areas and a set of third logical address areas based on the write frequencies and the read frequencies, the set of the first logical address areas being a set of the logical address areas having low write frequencies and high read frequencies, the set of the second logical address areas being a set of the logical address areas having high write frequencies excluding the set of the first logical address areas, and the set of the third logical address areas being a set of the logical address areas excluding the set of the first logical address areas and the set of the second logical address areas; and
the rewrite unit is configured to execute third rewriting for collectively rewriting data of the set of the third logical address areas to the hard disk drive.

13. The storage controller of claim 12, wherein the selection unit is configured to:
select a predetermined second number of logical address areas from the logical unit as a set of the second logical address areas in decreasing order of the write frequencies; and
select, excluding the set of the second logical address areas, a predetermined first number of logical address areas from the logical unit as a set of the first logical address areas in decreasing order of the read frequencies.

14. The storage controller of claim 12, wherein:
the storage controller is configured to control a second solid state drive as a spare solid state drive;
the rewrite unit is configured to:
execute, instead of the first rewriting, fourth rewriting for collectively rewriting data of a set of the first logical address areas to the spare solid state drive;
execute, instead of the second rewriting, fifth rewriting for collectively rewriting data of a set of the second logical address areas to the spare solid state drive; and
execute, instead of the third rewriting, sixth rewriting for collectively rewriting, to the hard disk drive, data of a set of fourth logical address areas which is allocated to the first solid state drive and is included in a set of the third logical address areas; and
the logical unit management unit is configured to:
switch the second solid state drive to the first solid state drive as the spare solid state drive after the fourth rewriting, the fifth rewriting and the sixth rewriting; and
switch the solid state drive allocated to the logical unit from the first solid state drive to the second solid state drive.

15. The storage controller of claim 12, wherein the rewrite unit is configured to:
copy data of the first solid state drive to the hard disk drive at the time of the rewriting, then erase the data of the first solid state drive and after the erase, read data of a set of the first logical address areas from the hard disk drive, and execute, instead of the first rewriting, fourth rewriting for collectively rewriting the data of the set of the first logical address areas to the first solid state drive; and
read data of a set of the second logical address areas from the hard disk drive, and execute, instead of the second rewriting, fifth rewriting for collectively rewriting the data of the set of the second logical address areas to the first solid state drive.

16. A method, implemented in a storage controller configured to control a solid state drive, for relocating data in the solid state drive, the method comprising:
collecting write frequencies of a plurality of logical address areas having a predetermined size which configure a logical area of a logical unit, a first physical area of the solid state drive being allocated to the logical area;
selecting, based on the write frequencies, a set of first logical address areas having low write frequencies and a set of second logical address areas excluding the set of the first logical address areas, respectively from the logical unit;
collectively rewriting data of the set of the first logical address areas to the solid state drive; and
collectively rewriting data of the set of the second logical address areas to the solid state drive.

17. The method of claim 16, wherein:
rewriting the data of the set of the first logical address areas includes logically overwriting data of a set of the first logical address areas on the set of the first logical address areas; and
rewriting the data of the set of the second logical address areas includes logically overwriting data of a set of the second logical address areas on the set of the second logical address areas.

18. The method of claim 17, wherein a predetermined number of logical address areas is selected from the logical unit as a set of the first logical address areas in ascending order of the write frequencies.

19. The method of claim 17, further comprising:
collecting read frequencies of the logical address areas; and
collectively rewriting, to a hard disk drive, data of a set of third logical address areas excluding a set of the first logical address areas and a set of the second logical address areas,
wherein:
the first physical area of the solid state drive and a second physical area of the hard disk drive are allocated to the logical unit;
the set of the first logical address areas and the set of the second logical address areas are selected based on the write frequencies and the read frequencies, the set of the first logical address areas is a set of logical address areas having low write frequencies and high read frequencies, and the set of the second logical address areas is a set of logical address areas having high write frequencies excluding the set of the first logical address areas; and selecting the set of first logical address areas and the set of second logical address areas includes selecting of a set of the third logical address areas from the logical unit.

20. The method of claim 19, wherein:

a predetermined second number of logical address areas is selected as a set of the second logical address areas in decreasing order of the write frequencies; and a predetermined first number of logical address areas is selected, in decreasing order of the read frequencies, from the logical unit as a set of the first logical address areas excluding the set of the second logical address areas.

* * * * *